June 14, 1960 J. T. WALLACE ET AL 2,940,232
135 AUTOMATIC SPOOLING MACHINE
Filed April 11, 1956 20 Sheets-Sheet 1
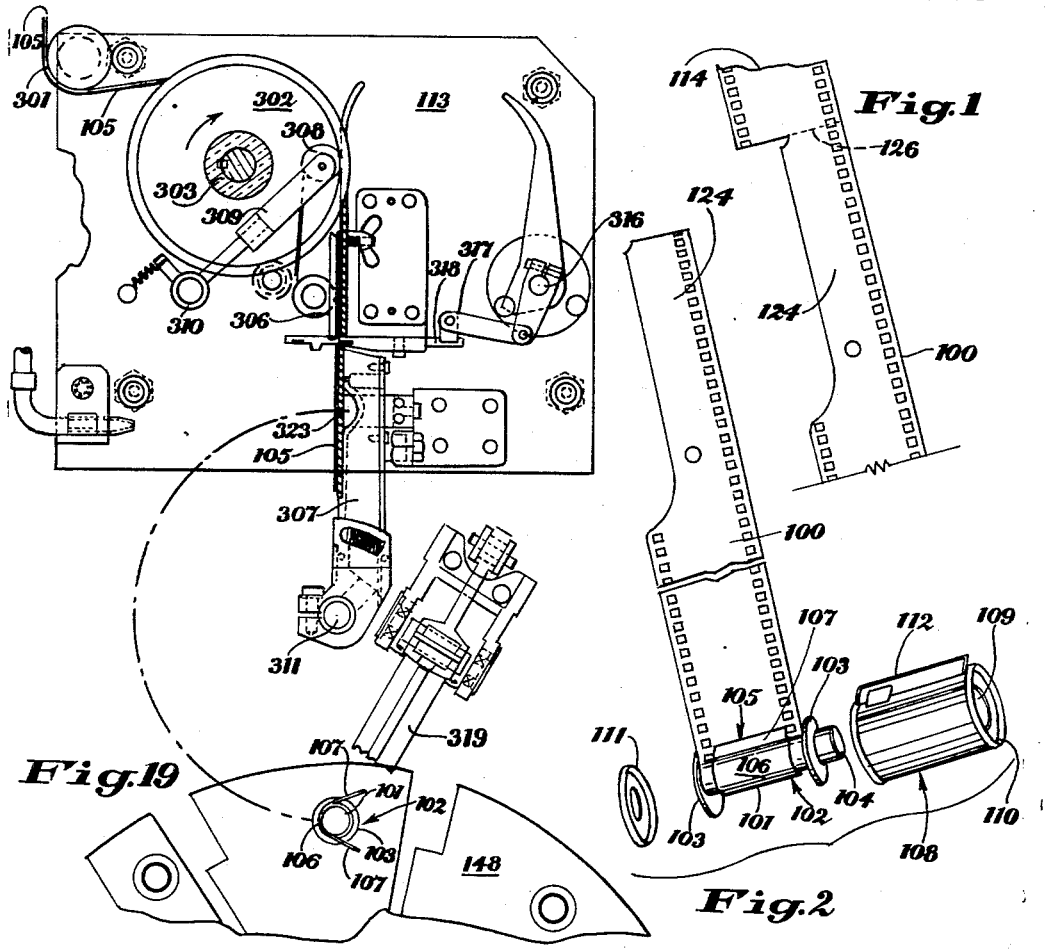
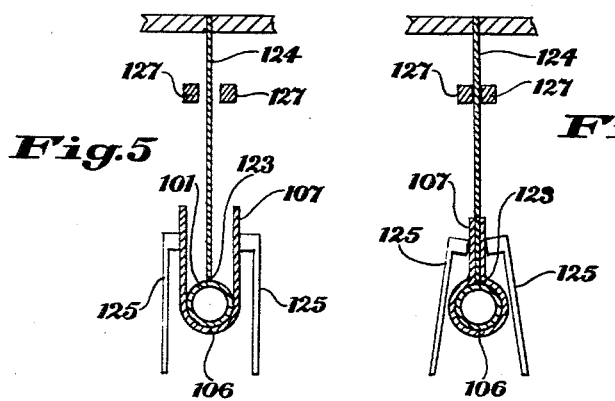
John T. Wallace
Clarence R. Wilson
INVENTORS
BY
ATTORNEYS

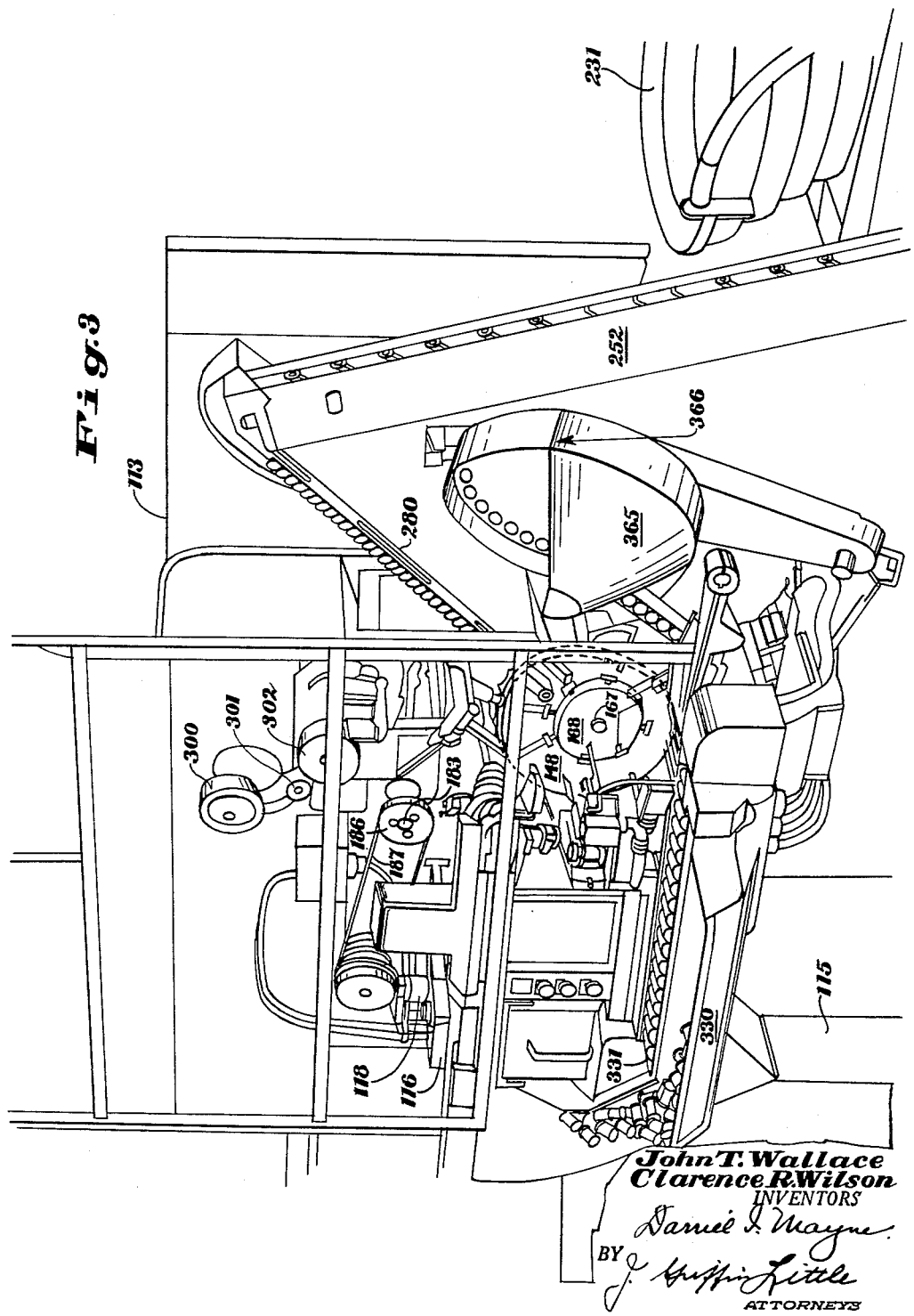

June 14, 1960  J. T. WALLACE ET AL  2,940,232
135 AUTOMATIC SPOOLING MACHINE
Filed April 11, 1956  20 Sheets-Sheet 3
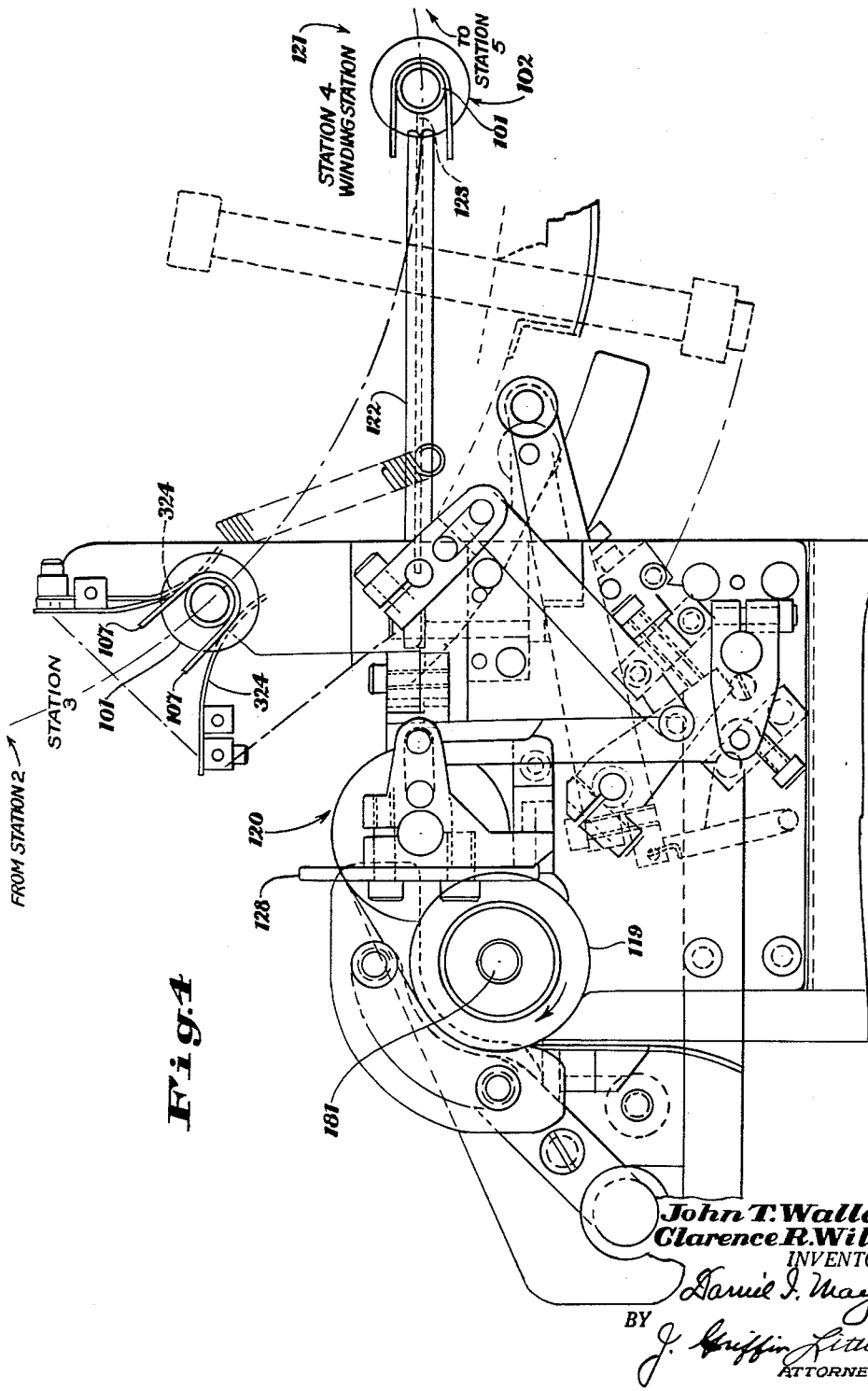
John T. Wallace
Clarence R. Wilson
INVENTORS
BY
ATTORNEYS

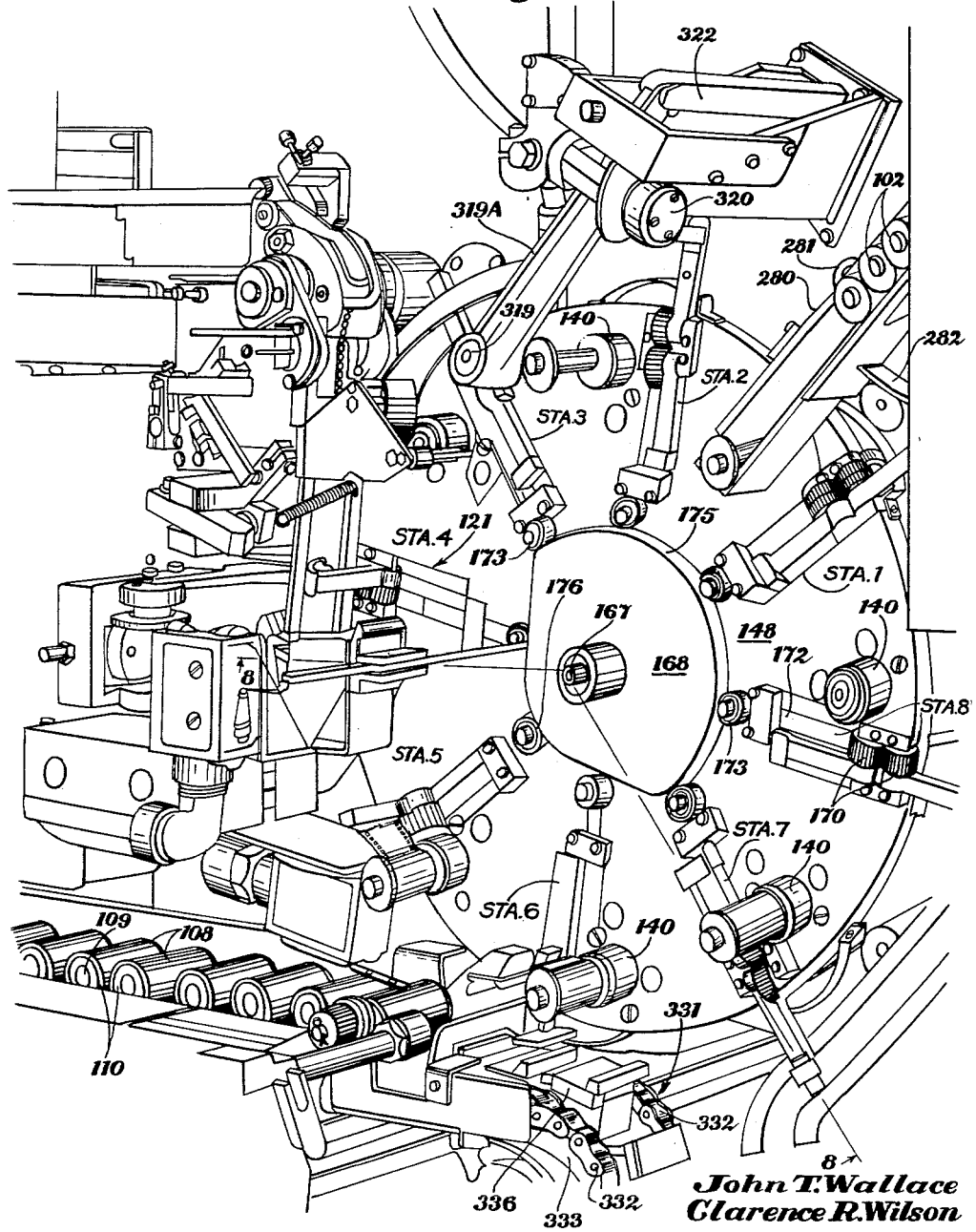

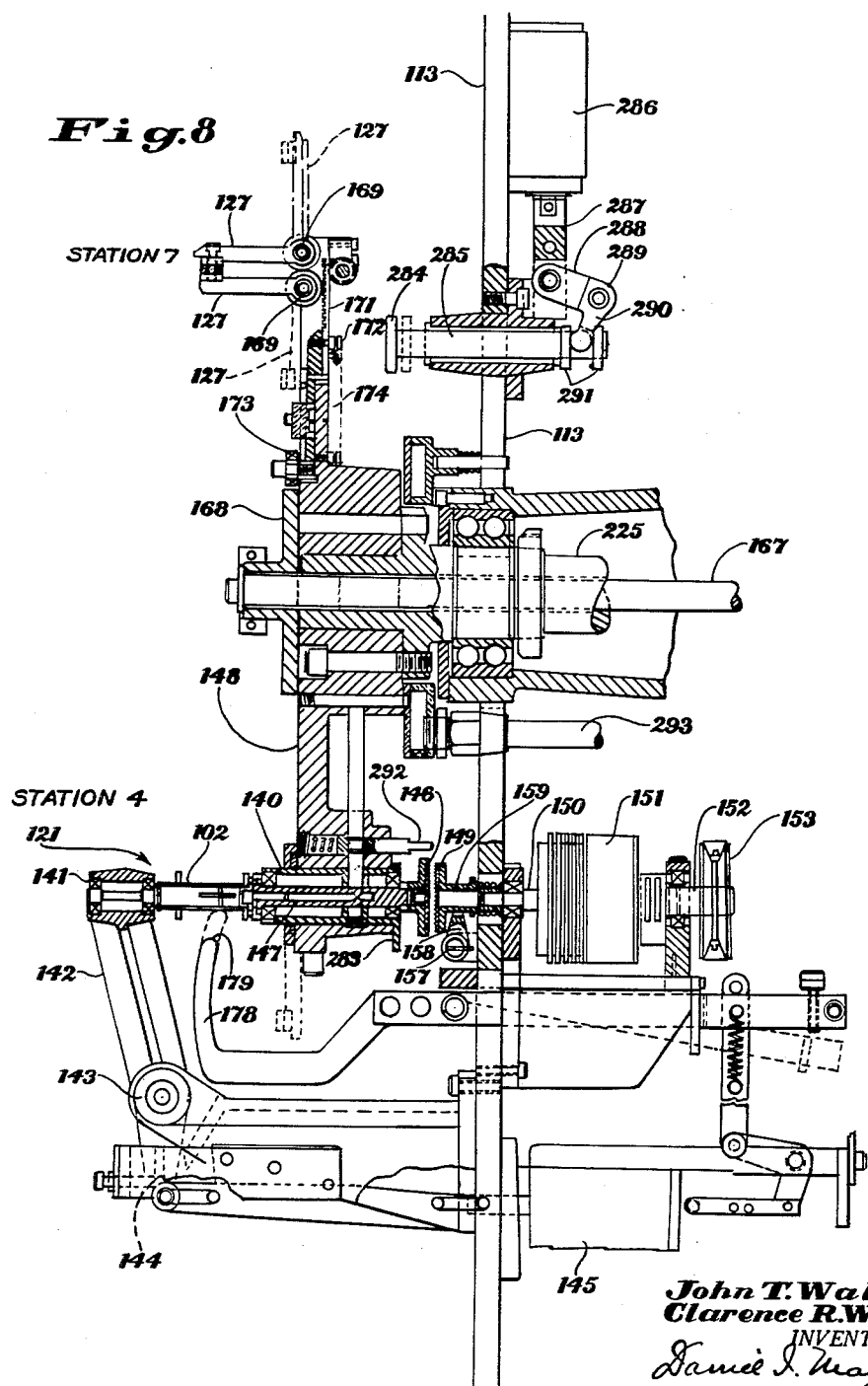

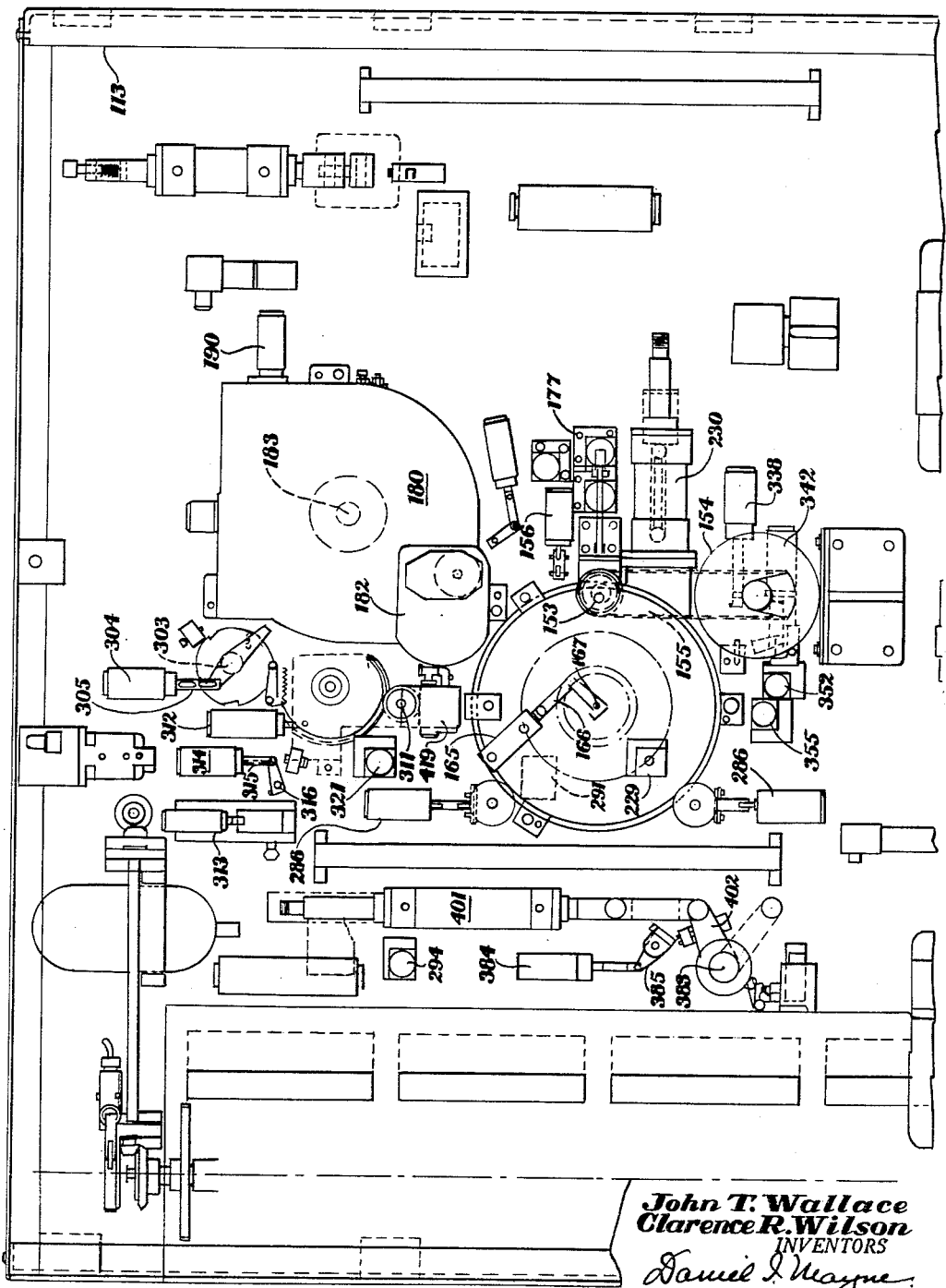

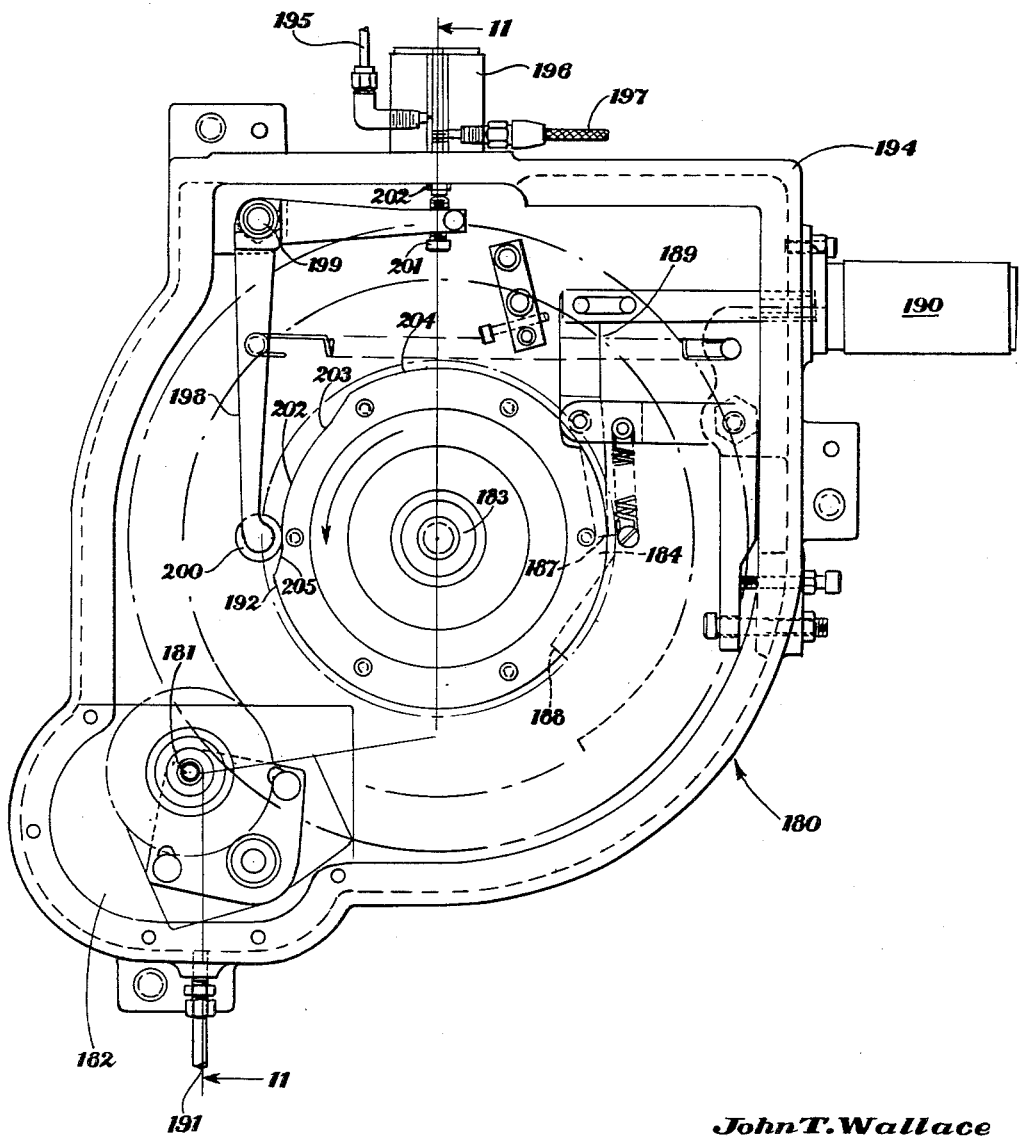

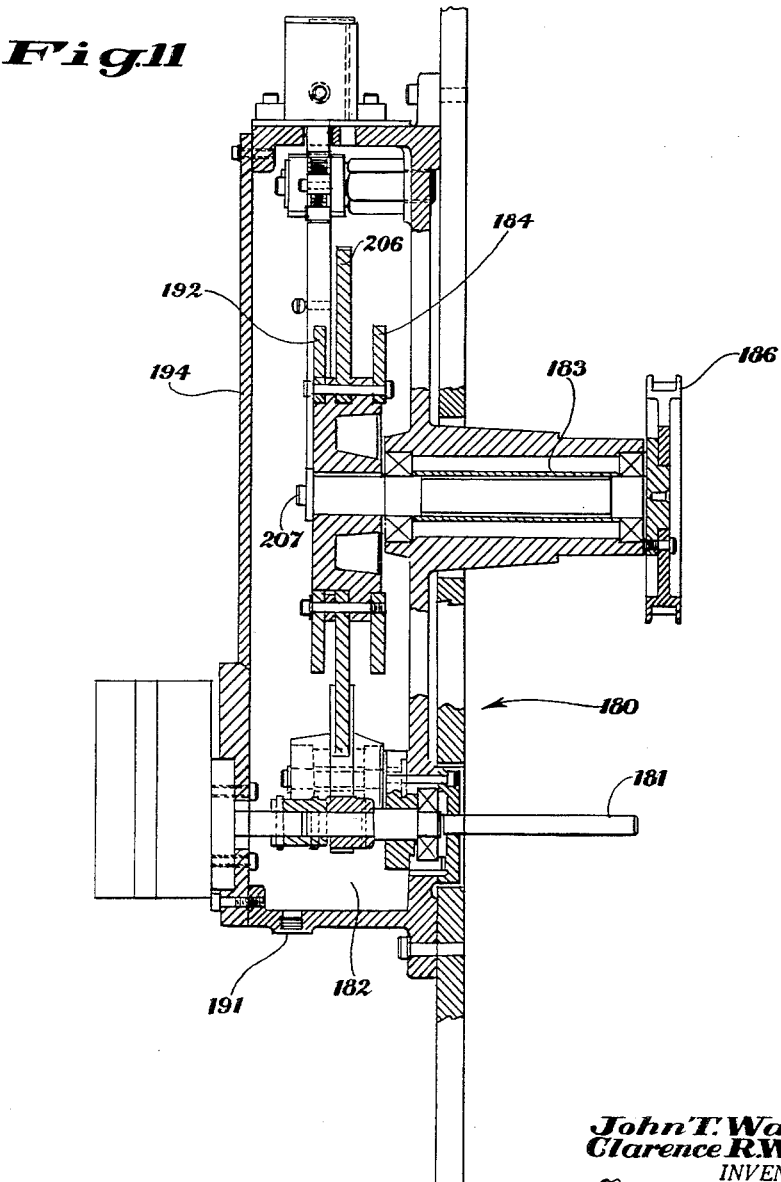

June 14, 1960 J. T. WALLACE ET AL 2,940,232
135 AUTOMATIC SPOOLING MACHINE
Filed April 11, 1956 20 Sheets-Sheet 9

John T. Wallace
Clarence R. Wilson
INVENTORS

BY
ATTORNEYS

June 14, 1960

J. T. WALLACE ET AL 2,940,232

135 AUTOMATIC SPOOLING MACHINE

Filed April 11, 1956

John T. Wallace
Clarence R. Wilson
INVENTORS

BY

ATTORNEYS

June 14, 1960 J. T. WALLACE ET AL 2,940,232
135 AUTOMATIC SPOOLING MACHINE
Filed April 11, 1956 20 Sheets-Sheet 11

John T. Wallace
Clarence R. Wilson
INVENTORS

BY
ATTORNEYS

June 14, 1960  J. T. WALLACE ET AL  2,940,232
135 AUTOMATIC SPOOLING MACHINE
Filed April 11, 1956  20 Sheets-Sheet 12
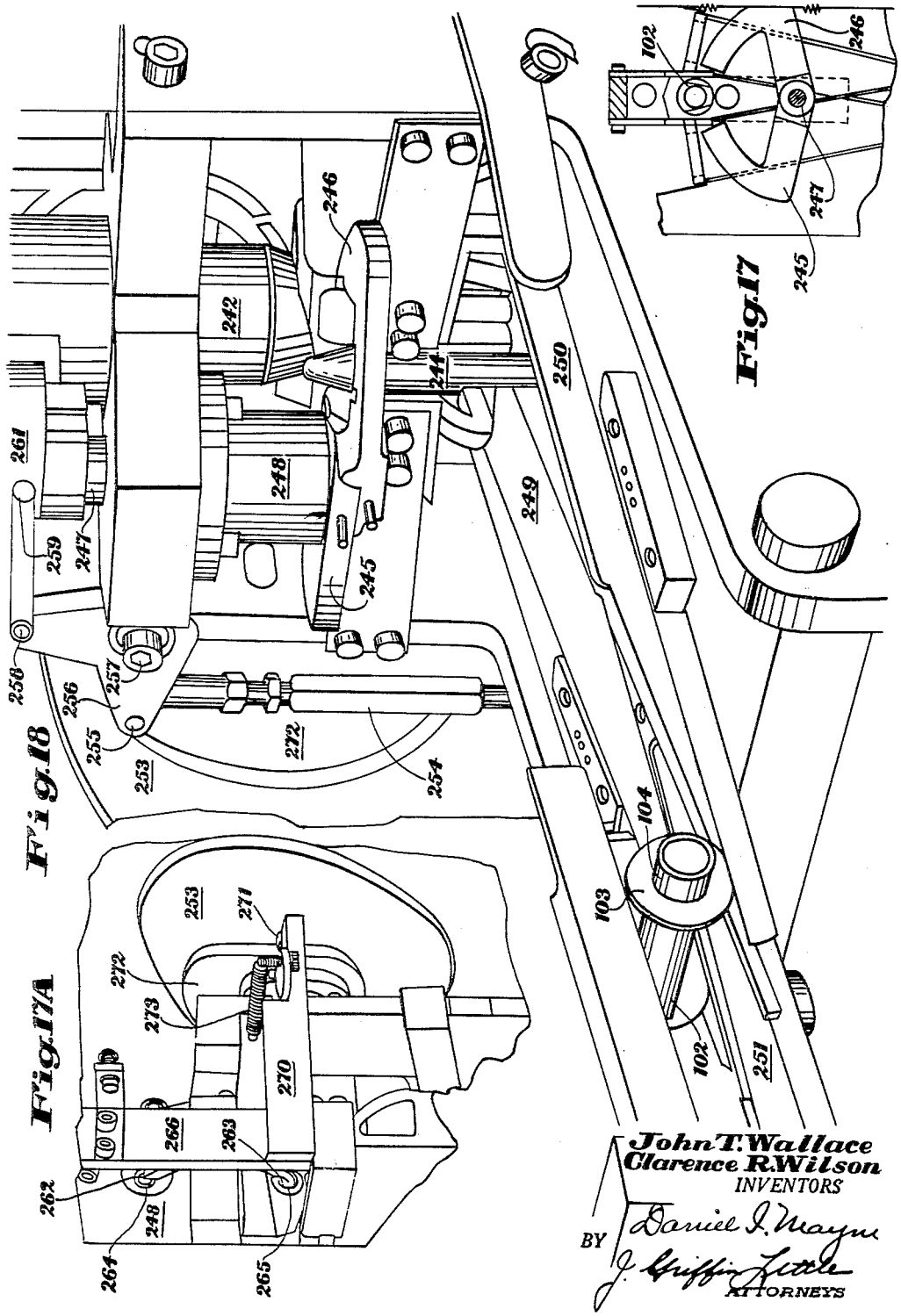
John T. Wallace
Clarence R. Wilson
INVENTORS
BY Daniel I. Mayne
J. Griffin Little
ATTORNEYS

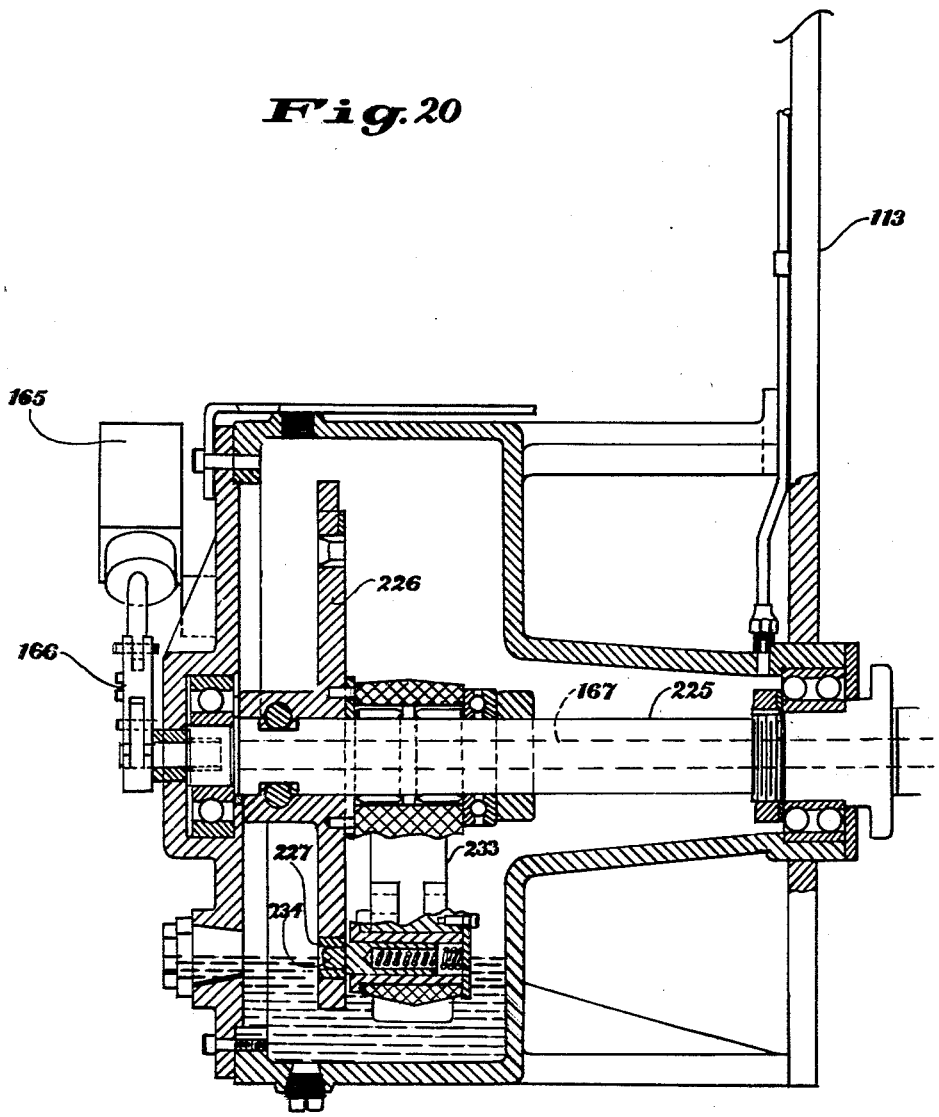

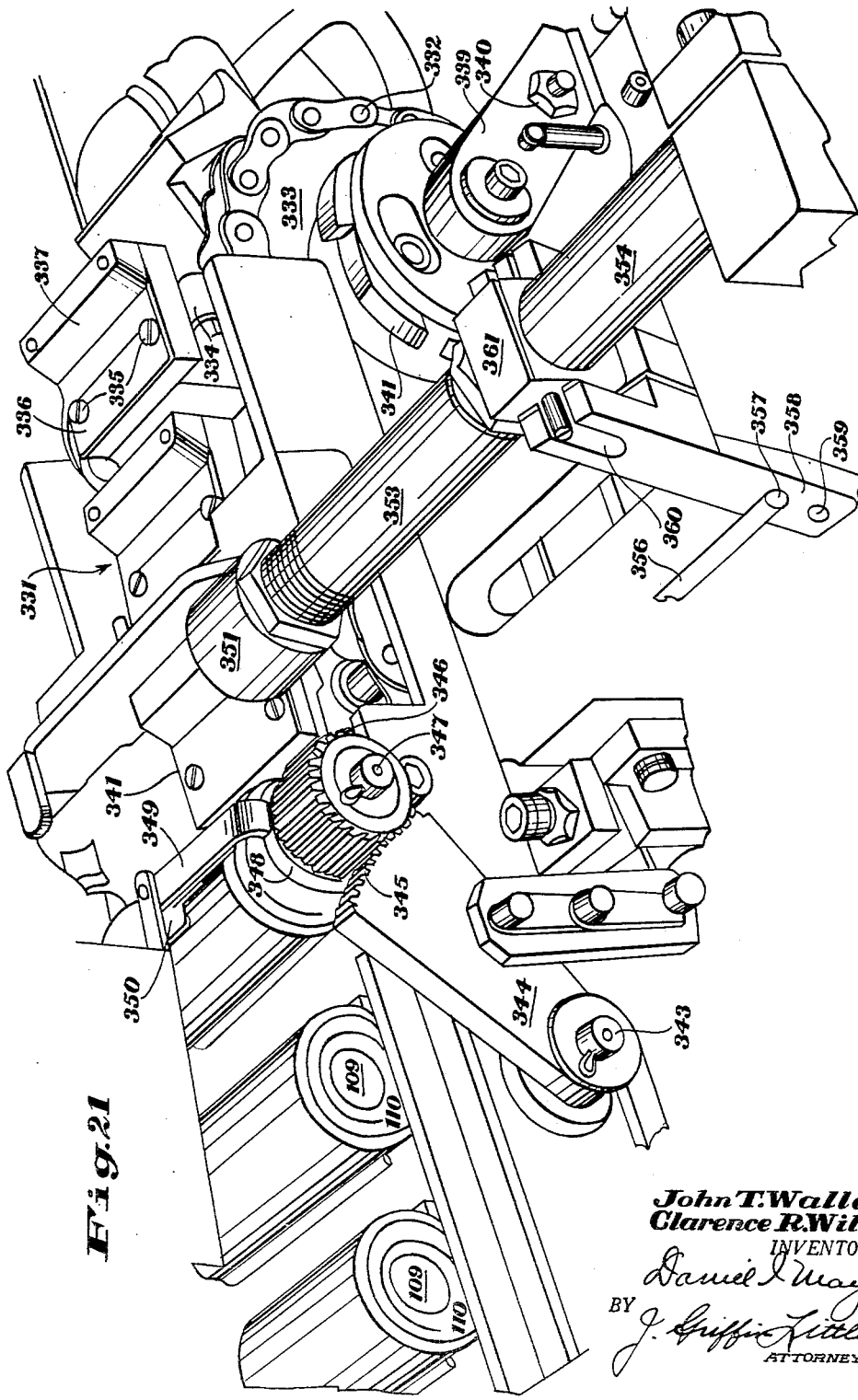

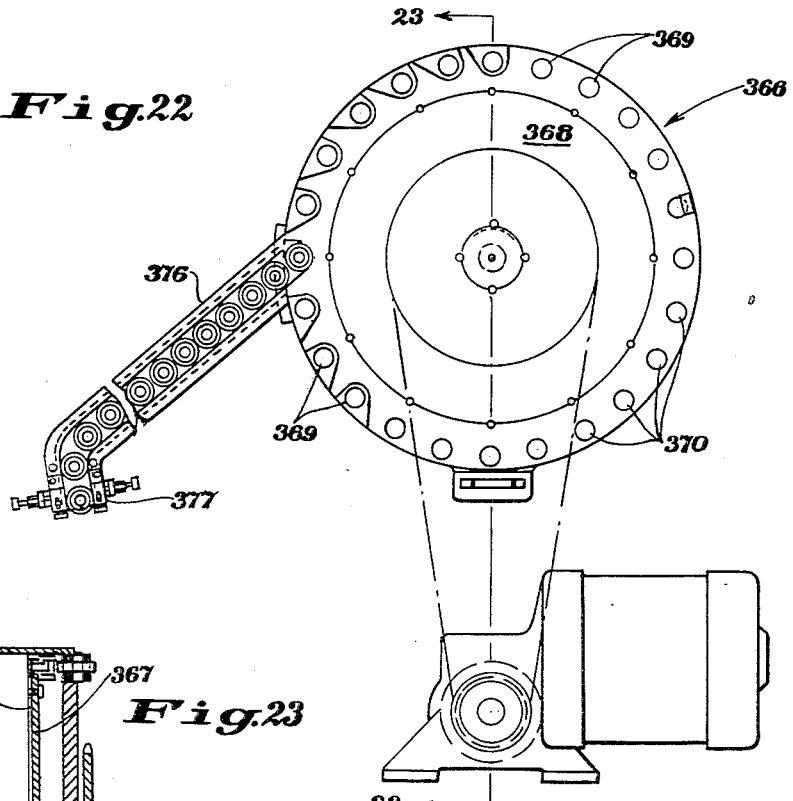

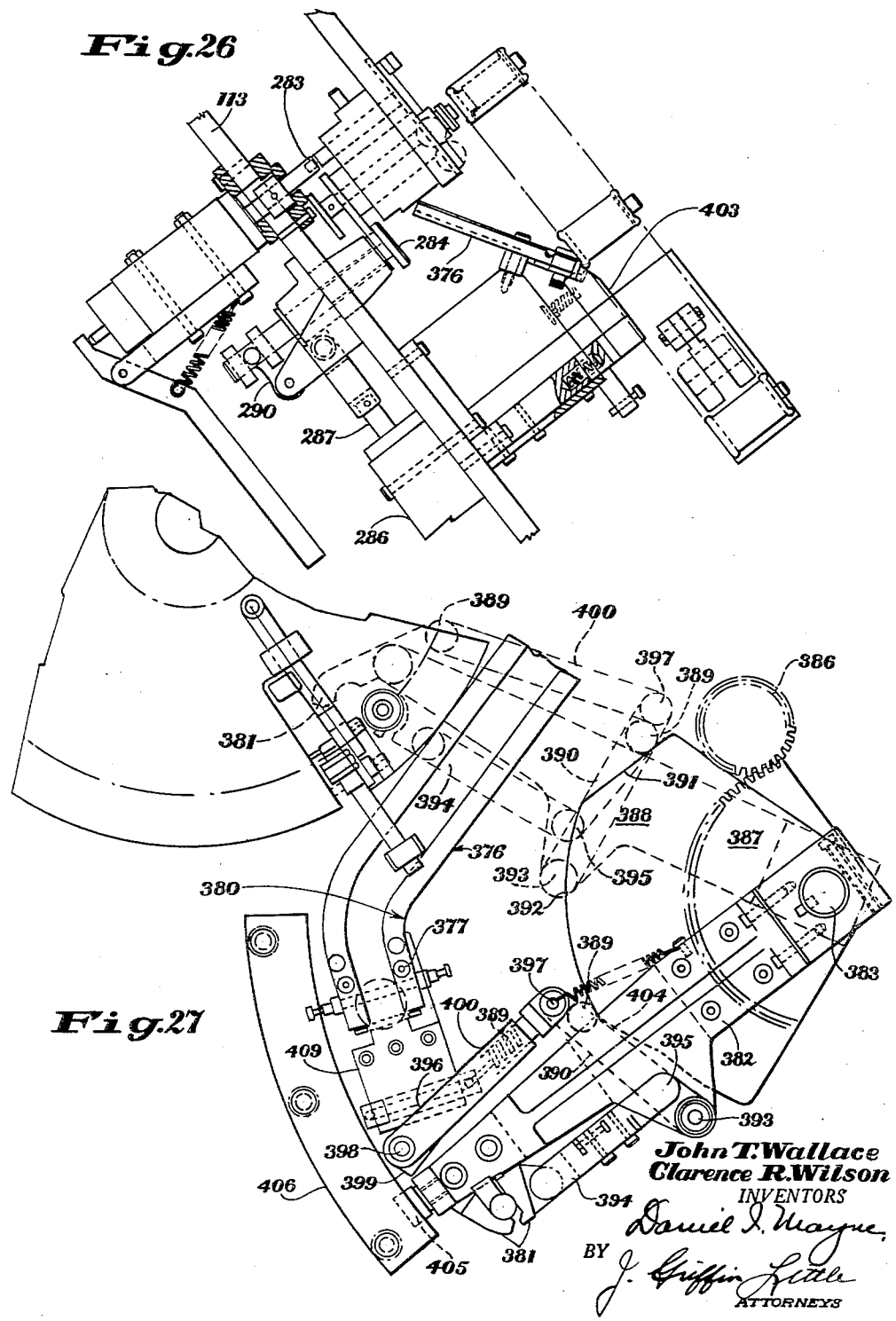

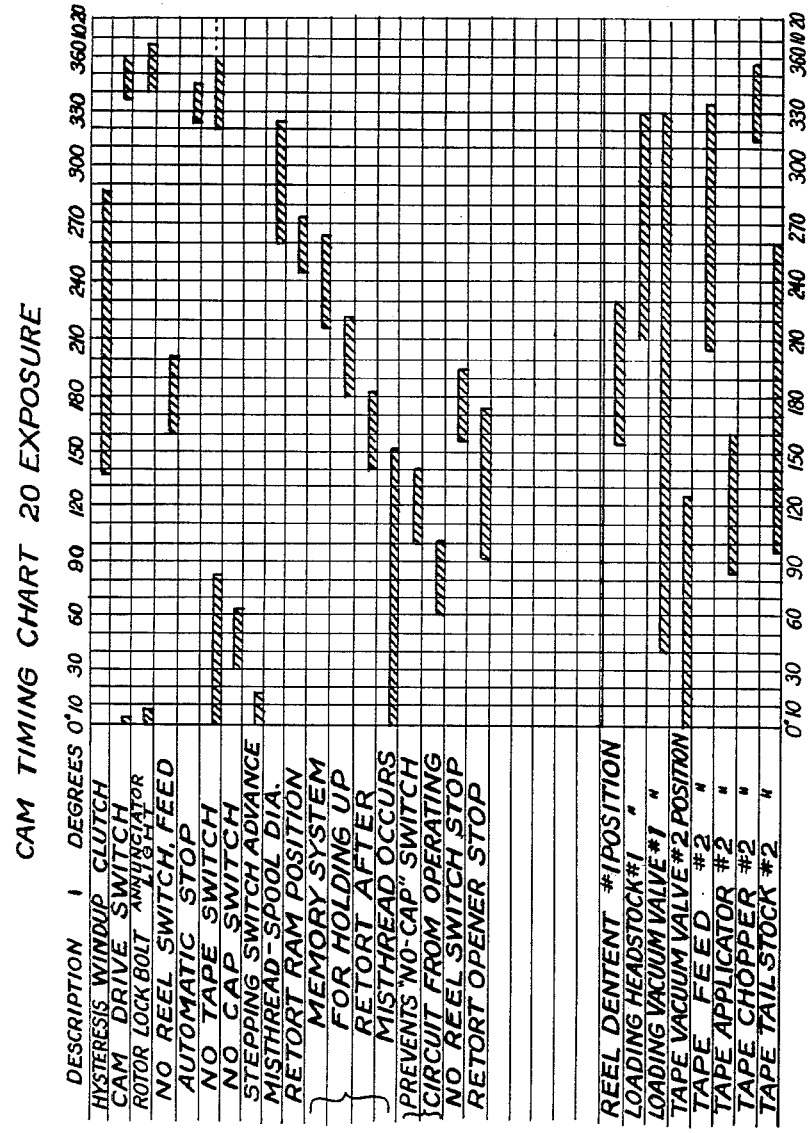

Fig. 29

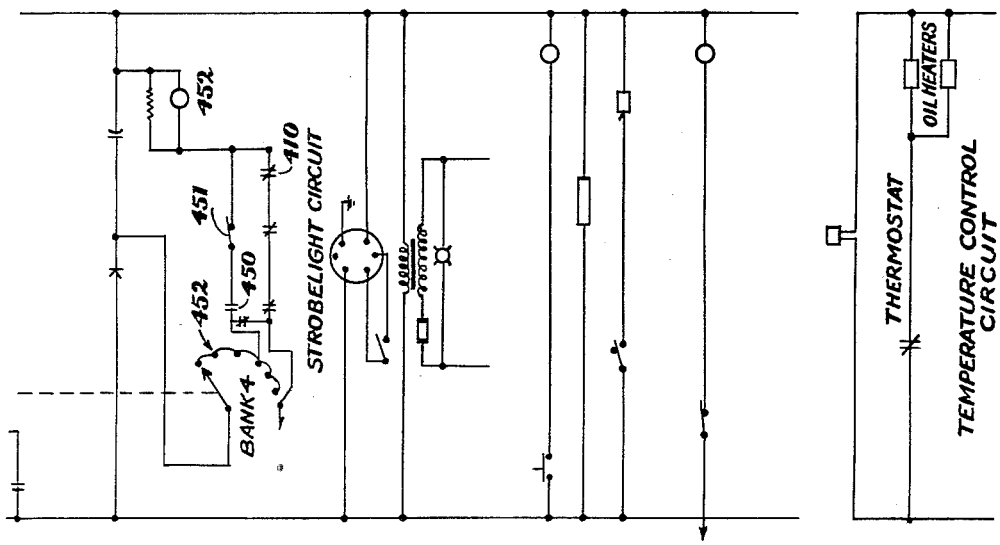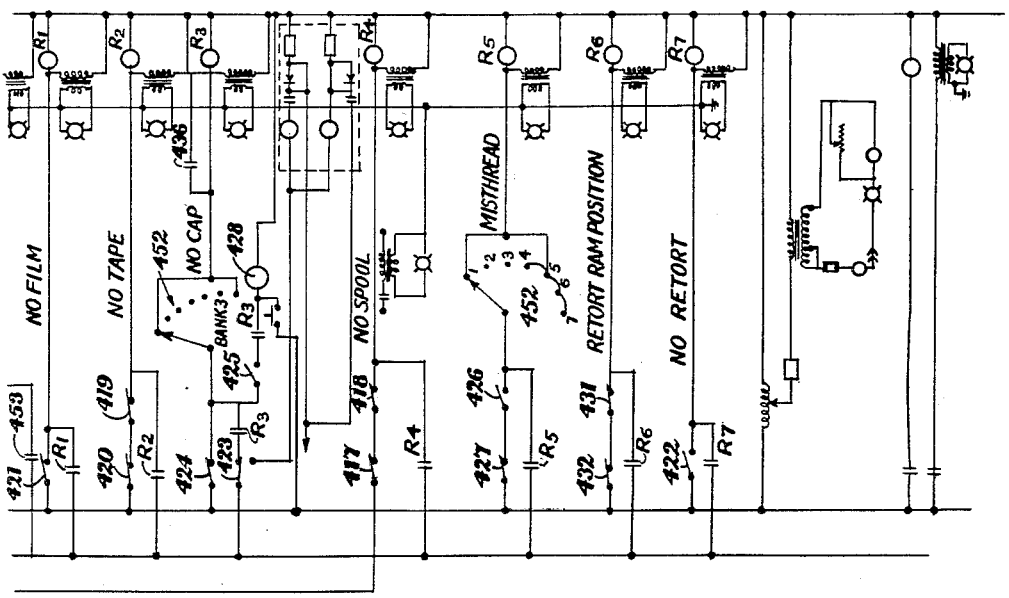
Fig. 30

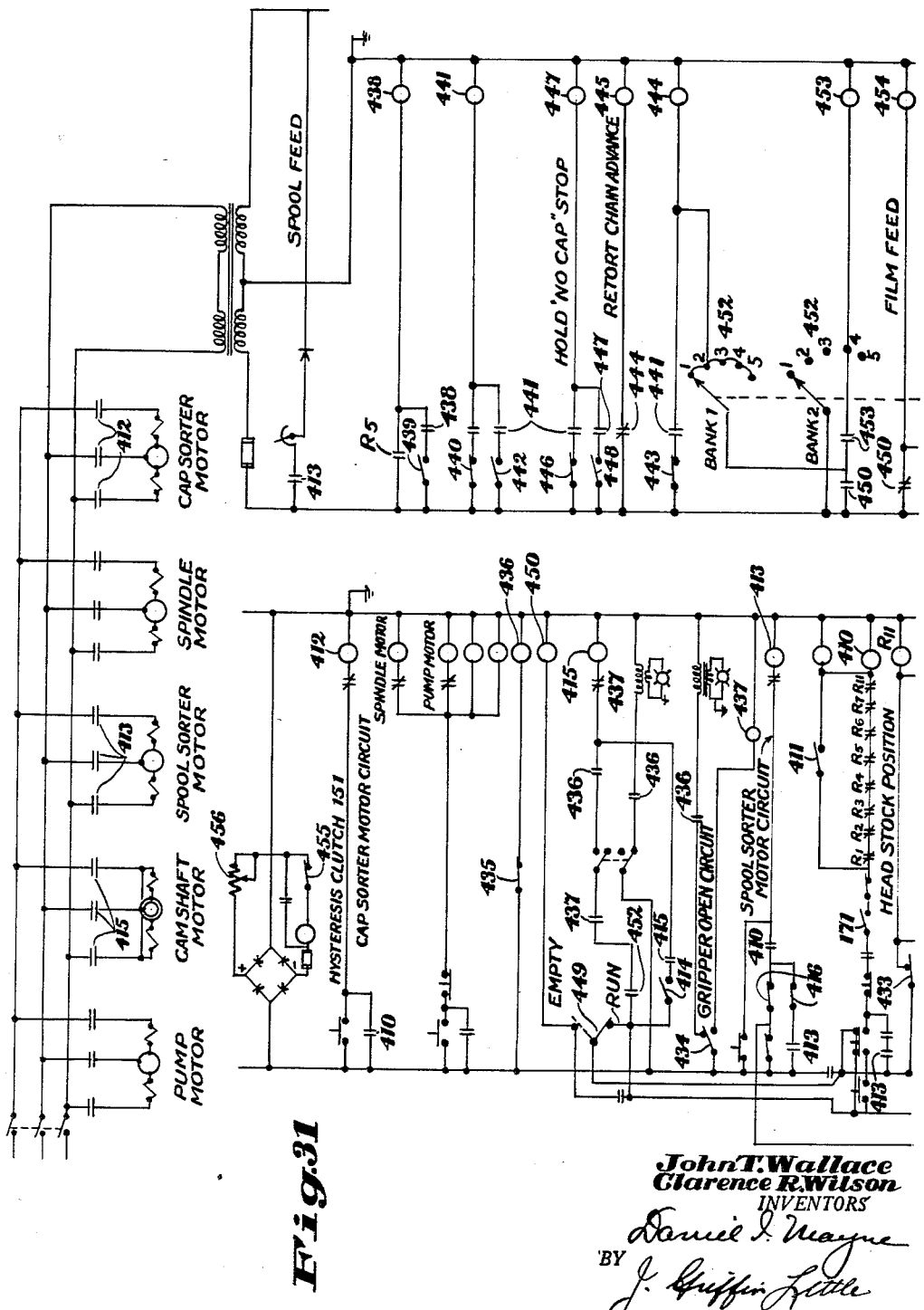

United States Patent Office 2,940,232
Patented June 14, 1960

2,940,232

135 AUTOMATIC SPOOLING MACHINE

John T. Wallace and Clarence R. Wilson, Rochester, N.Y., assignors to Eastman Kodak Company, Rochester, N.Y., a corporation of New Jersey Filed Apr. 11, 1956, Ser. No. 577,585

11 Claims. (Cl. 53—112)

The present invention relates to an improvement in winding machines, and more particularly to a new and improved spooling machine for winding automatically a strip of 35 mm. film onto a spool, and then enclosing the wound spool in a capped retort. The complete assembly of spool, film, tape and retort are designated as a magazine.

The machine of the present invention is designed to wind 35 mm. film onto a plastic spool that is enclosed in a capped retort, illustrated in Fig. 2. The finished retort is light tight and is used in miniature cameras. The machine can be set up to wind 20 or 36 exposure film strips; but, with slight adjustment, can be made to wind various lengths of film. The machine is designed to operate at a speed of thirty 20-exposure spools per minute; but the output will vary with the actual film length which is wound. The operator supplies the machine with film, tape, spools, caps and retorts. The film, tape, spools and caps are fed automatically. The retorts are loaded onto a moving conveyor by the operator, and are oriented prior to assembly to the wound film spool. The machine stops automatically at the end of a cycle if any of the materials are depleted. Indicator lights, not shown or described, on the operating panel show which material is exhausted. By supplying the machine with the exhausted material operation may be resumed.

The machine is briefly described as follows: Plastic spools are fed from a vibratory feed bowl into a spool orienting mechanism where the spools are arranged in a definite relation, to be later described. The oriented spools are then conveyed individually to an indexing rotor which carries the spool in a step-by-step relation to various stations where various functions are performed, as also will be later described. The indexing rotor has eight stations each of which is equipped with a vacuum head stock and cam operated film grippers. The rotor is indexed 45° counterclockwise at the end of each operation.

An adhesive coated tape is pulled from a roll by a measuring device, and is held on a vacuum box and chopped off to length. The box is then pivoted to apply the tape to the core of a film spool. After such application, the rotor is indexed to the next station where the tape is further wrapped into a U shape around the spool core. The next indexing of the rotor brings the spool with its attached tape to the winding station.

The film to be wound is fed from a supply stock roll, positioned in a film cabinet, to a film notching mechanism where a tail of the film is notched out, as shown in Fig. 1. The notched film then passes under an edge printer where a latent image is printed on the edges of the film. The notched and edge printed film is then fed through a film measuring device to a winding station where the film is secured to the spool which has been moved to the winding station, as above described. A measured length of film is then wound on a spool and then severed from a web. The spool and this wound film is then moved to a station where an open-end retort is placed over the wound spool. The indexing of the rotor brings the spool and retort to a station where an end cap is placed over the open end of the retort to complete the magazine. The latter is then discharged from the rotor into a suitable receptacle.

The invention has as its principal object the provision of a machine for winding automatically a length of film onto a spool and then applying a retort over the wound spool.

A further object of the invention is the provision of a mechanism for moving a film spool automatically and in timed relation to various stations where different operations are performed thereon.

Still another object of the invention is the provision of a mechanism to apply a tape to a film spool and position the tape on the spool to receive the film which is to be wound on the spool.

Yet another object of the invention is the provision of a new and improved device for delivering and measuring a length of film to be wound.

Yet another object of the invention is the provision of a mechanism for automatically orienting the film spools prior to the application of the film thereto.

And another object of the invention is the provision of a mechanism for supplying and orienting a retort for application to a wound film spool.

And a still further object of the invention is the provision of a mechanism for automatically applying an end cap to the retort.

To these and other ends the invention resides in certain improvements and combinations of parts, all of which will be hereinafter more fully described, the novel features being pointed out in the claims at the end of the specification.

In the drawings:

Fig. 1 is a view of a portion of a film strip, showing the relation of the notch and the line of severance of the film strip from the film web;

Fig. 2 shows the relation of the severed film strip, and the means for attaching the film to the spool as well as a relation of the spool to the retort;

Fig. 3 is a general front view of the machine of the present invention, showing the relation of the various parts;

Fig. 4 is a front view of the winding station showing the film threader, and the relation of the film spool thereto;

Fig. 5 is a diagrammatic partial view of the winding station, showing the relation of the tape squeezers and the film grippers in open relation;

Fig. 6 is a view similar to Fig. 5, but with the squeezers and grippers in closed relation;

Fig. 7 is a front view of the rotor, showing the various stations where different operations are performed. For the purpose of clarity, certain elements are omitted in this view, but these elements are disclosed in the various detailed views;

Fig. 8 is a general horizontal view taken through the rotor and substantially in line 8—8 of Fig. 7, showing the relation of the parts to the winding station and with the film grippers in closed position in full lines;

Fig. 9 is a general back view of the machine showing the various operating cylinders in other control mechanisms;

Fig. 10 is a partial view of the mechanism illustrated in Fig. 9, showing the film measuring unit;

Fig. 11 is a sectional view taken substantially on lines 11—11 of Fig. 10, showing the relation of the parts of film measuring mechanisms;

Fig. 17 is a top view of the spool tipping arms;

Fig. 17A is a partial view taken from the right of Fig. 18B, showing the spool releasing or escapement mechanism;

Fig. 18 is a perspective view of the film tracks which direct the oriented spools from the orienting means to the elevating mechanism;

Fig. 19 is a front elevation view of the tape-applying mechanism showing the relation thereof to the indexing rotor;

Fig. 20 is a vertical sectional view taken substantially on line 20—20 of Fig. 12, showing the rotor moving means and the mechanism for operating the film grippers;

Fig. 21 is a perspective view of a portion of the machine illustrated in Fig. 3, showing the retort supplying, orienting and delivering mechanisms;

Fig. 22 is a front view of a cap sorter and delivery mechanism;

Fig. 23 is a vertical sectional view taken substantially on line 23—23 of Fig. 22, showing the relation of the cap ejector to the sorter disc;

Figs. 24 and 25 show the mechanism for delivering properly oriented caps;

Fig. 26 is a side elevation view of the portion of the machine adjacent the cap supply mechanism, with parts in section, showing the relation of the rotor, the cap supply chute and the mechanism for applying an end cap to the retort;

Fig. 27 is a right end view of a portion of the mechanism illustrated in Fig. 26, showing the device for moving the retort to the cap applying mechanism, and then to a receptacle;

Figs. 28 and 29 represent the timing chart for the various elements of the machine, showing the timed relation of the various elements;

Figure 13:
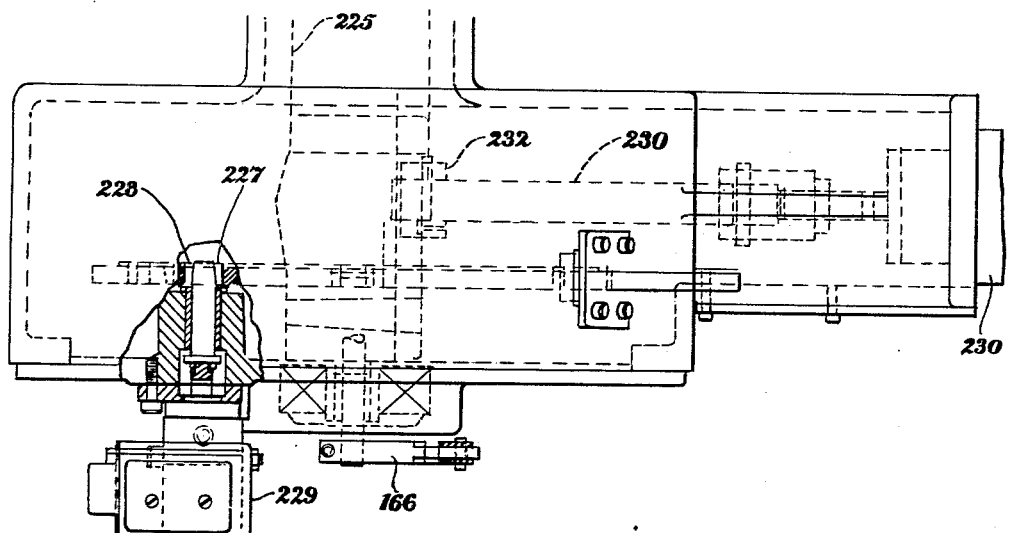
Fig. 13 is a plane view of the mechanism illustrated in Fig. 12, with parts in section.

Figs. 30 and 31 constitute the wiring diagram for the machine showing the various controls, switches and interlocks.

Similar reference numerals throughout the various views indicate the same parts.

The general purpose of the machine is to cut a strip 100 of film from a film web 114, and to wind this cut length automatically onto the core 101 of a spool 102. The latter is formed with end flanges 103 arranged at the opposite ends of the core 101, as shown in Fig. 2. One end flange has protruding axially therefrom a hub 104. The core 101 has secured thereto, in a manner to be later more fully described, an adhesively coated tape 105, the central portion 106 of which is wrapped around the core 101, while the end portions 107 are secured adhesively to opposite faces of the film strip to attach the latter to the film core as will be deemed apparent from an inspection of Figs. 5 and 6. After the film strip 100 is wound on the core 101, a retort, broadly designated by the numeral 108, is slid over the spool, the hub 104 extending through an aperture 109 in the end cap 110 of the retort, the opposite cap 111 being later applied to the retort. A portion 124 of the film strip will project through spaced lips 112 of the retort, as is well known.

The machine of the present invention is cam timed, hydraulically operated, and is provided with electrical interlocks and automatic stops of the general type shown and described in the copending application to Edwards et al., Ser. No. 399,554, filed December 21, 1953, now U.S. Patent No. 2,776,094, to which reference may be had for detailed showing and description of the various cams, cylinders and valves. As these elements do not constitute, per se, a part of the present invention, they are not shown or described herein. The various cams, hydraulic cylinders and various operating mechanisms are mounted on the main machine panel 113. The various elements which relate specifically to the present invention will be later described in more detail.

The film which is to be wound is supplied in the form of a web 114 which is carried by a stock roll, not shown, which is rotatably mounted in a cabinet 115 positioned at the lower left hand part of the machine, as shown in Fig. 3. From the cabinet 115, the film web 114 is fed vertically and then horizontally so as to pass through a film punch generally indicated by the numeral 116 which punches out a portion of the film strip to form a narrow end tab 124 of the shape best shown in Figs. 1 and 2. The tab is at the trailing end of the strip 100 as the latter is wound on the film spool 102, as is deemed apparent. From the punch the film web is passed through an edge printer, generally indicated by the numeral 118. At the edge printer, latent images of certain identifying designations are printed on the film at both edges thereof. As the film punch and edge printer form no part of the present invention, details thereof are not shown or described. Suffice it to say that the punching and edge printing operations are performed while the film web is being moved intermittently horizontally by means to be later described. The punch and edge printer are carried on the front of the main panel 113.

A sprocket 119 on the film theader, see Fig. 4, broadly designated by the numeral 120, serves to pull the film web from the stock roll in cabinet 115 through the punch 116 and the edge printer 118 and feeds the web to the film spool 102 which is positioned at the winding station, shown at 121 of Fig. 4. The web is directed from a sprocket 119 through a guide 122 to the spool 102, the web being positioned between the spaced end portions 107 of the tape, see Fig. 5, these end portions extending substantially tangentially from the spool core. The film spool is moved to and held in position at the winding station by means to be later described. The leading edge or end 123 of the film web is fed toward the spool core 101 as shown in Figs. 4 and 5. The feed is then stopped and a pair of tape squeezers 125, see Figs. 5 and 6, are positioned on opposite sides of the spool and are moved towards each other from the position shown in Fig. 5 to that shown in Fig. 6 to place the adhesive coated surfaces of the ends 107 of the tape 105 against the opposite faces of the film strip 100 to attach or anchor the end 123 to the spool, all of which is shown in Figs. 5 and 6. Then, the sprocket is again started to feed a definite length of the film to the spool 102, which, in turn, is rotated by a separate drive means to wind up the film on the spool. After the measured length has been wound, the notched out section 124 of the web is positioned between the spool 102 at station 121, and the feed sprocket 119. In order to prevent clock springing of the film which is wound on the core, the portion 124 is clamped prior to the severing of the web at line 126. To secure this result, a pair of film grippers 127 are positioned on opposite sides of and spaced from section 124, as shown in Fig. 5. These grippers 127 are then moved to the position shown in Fig. 6 to grip the film section 124 between the spool 102 and the feed sprocket 119. After the section 124 is thus gripped by the grippers 127, a reciprocating knife 128 cooperates with a fixed knife, not designated, to sever the web along the line 126 to provide a strip of film of the desired length. As the knife 128 may be of any suitable design and forms no part of the present invention, details thereof are not shown or described. Now, a definite length of film has been fed, secured to the spool core 101, and wound on the core, and the notched out section 124 is clamped by the members 127 to hold the film in tightly wound relation on the film spool and to prevent clock springing of the wound film.

At the winding station 121 the film spool 102 is held between a retractable headstock 140 and a pivoted tail stock 141, see Fig. 8. The latter is carried on an end of an arm 142, the other end of which is rockable on a shaft 143. The latter is connected by a linkage 144 to a hydraulic cylinder 145. The result is that when fluid pressure is applied to one side of cylinder 145, the arm 143 is rocked clockwise, as viewed in Fig. 8, to move the tail stock 141 to the right to cooperate with the headstock 140 to hold the spool 102 in aligned position at the winding station 121 to be rotated by the drive means to be presently described. However, when the pressure is taken off at cylinder 145, an internal spring therein serves to move the linkage 144 and arm 142 to shift the tail stock 141 to the left and out of engagement with the spool 102, the latter now being held only by the headstock 140. In this position the spool may be moved from one station to another by the indexing of the rotor 148 in a manner to be later described.

In order to rotate the headstock 140 and spool 102 at the winding station 121 the headstock 140 is releasably connected to a suitable drive means which comprises a clutch member 146 secured to or formed integral with the headstock and slidable with the latter and with a supporting shaft 147 in the rotor, broadly designated by the numeral 148 and to be later more fully described. A cooperating clutch member 149, Fig. 8, is carried by a shaft 150 arranged in axial alignment in shaft 147. Shaft 150, in turn, is connected through a hysteresis clutch 151 to a shaft 152 which has mounted thereon a pully 153 which is constantly driven by means of an electric motor 154 through a belt 155, see Figs. 8 and 9. The result is that when electrical energy is applied to clutch 151 shaft 150 is caused to rotate. Then, a winding spindle clutch cylinder 156, Fig. 9, has pressure applied thereto to rock shaft 157, Fig. 8, counterclockwise. Shaft 157 carries a radially extending arm 158 which engages with an axial sleeve 159 of clutch 149 to move the latter axially to the left along shaft 150 and into driving relation with clutch member 146. When the clutch members 146 and 149 are disengaged a brake, not shown, serves to hold shaft 147 against rotation. This brake cooperates with the film grippers 127 to prevent the film at the spool winding station from clock springing. However, when clutch member 149 is moved to the left, as above described, a second radial arm, not shown, on shaft 157 engages and moves the brake out of holding relation with shaft 147 to free the latter so that it may be rotated to wind the film.

As mentioned above, after the winding at station 121 has been completed, the film grippers 127 are moved from the position shown in Fig. 5 with that shown in Fig. 6 to grip the portion 124 of the film and to cooperate with the above-mentioned brake to hold the film in a tightly wound relation on the spool at the winding station. Now, when the winding has been completed and prior to the severing of the film, a cylinder 165, Figs. 9 and 20, has pressure applied thereto which moves the piston thereof to shift a linkage 166, connected to shaft 167, to rock the latter to move a cam 168 attached to the front end of shaft 167, as best shown in Figs. 7 and 8. While the rotor 148 is indexing, the shaft 167 and cam 168 are stationary relative to the rotor. Each of the grippers 127 is rockable about a shaft 169 on which is mounted a gear 170, see Fig. 7, which engages a rack 171 carried by a sliding member 172, Fig. 7, the inner end of which carries a cam follower 173, see Figs. 7 and 8, which rides on a periphery of a cam 168. A coil spring 174 has one end anchored to rotor 148 and the other end connected to the slidable member 172 to hold the cam follower 173 in positive engagement with cam 168. Such engagement serves to hold the member 172 in its inner position to cause the grippers 127 to be moved to open relation, as shown at the right side of Fig. 7, and in dotted lines in Fig. 8.

As the film is being wound onto the spool 102 at the winding station 121, the grippers 127 must be in their open position, as shown in dotted lines Fig. 8. At this time, the high point 175 of cam 168 must be in engagement with the cam follower 173 associated with the member 172 of the grippers 127 at the winding station to hold the grippers in open position during winding. However, when the winding has been completed, the shaft 167 and cam 168 are partially rotated or rocked clockwise to the position shown in Fig. 7 to bring the low point 176 of the cam 168 to the position illustrated in Fig. 7. In this position, the spring 174 will move member 172 inwardly to maintain engagement of follower 173 with cam 168. This inward movement of member 172 similarly moves rack 171 to rotate gears 170 and shaft 169 to move the gripping member 127, from the dotted position to the solid line position, Fig. 8, to grip the opposite sides of the film portion 124, as shown diagrammatically in Fig. 6. After the winding operation, the rotor 148 is indexed 45° counterclockwise in a manner and for a reason to be later described. At the same time the rotor 148 is indexed, the shaft 167 and cam 168 are rocked counterclockwise by the mechanism described to bring the high point 175 of cam 168 into position to engage the follower 173 associated with the grippers 127 at the winding station to hold the grippers open during the film winding operation. After the winding has been completed, the shaft 167 and cam 168 rock again clockwise to bring the cam to the position shown in Fig. 7 to cause grippers 127 to move into gripping relation with the film, as above described.

Thus, when the rotor 148 is indexed to move the grippers 127 and the associated parts from station 3 to station 4, to be later described, the cam 168 will move as a unit with rotor 148 to maintain the grippers in open position while they move from station 3 to station 4. However, when the parts reach station 4 the high point 175 of cam 168 remains in engagement with the roller 173 associated with the winding station to maintain the grippers 127 in open position during the entire winding operation. Then the cam 168 is indexed clockwise relative to the rotor 148 and back to the position illustrated in Fig. 7 to bring the low point 176 of cam 168 into position to close the grippers 127, as above described. This movement of cam 168 counterclockwise with the rootr and then clockwise relative thereto takes place at each 45° indexing of the rotor.

After the film winding has been completed, a cylinder 177, Fig. 9, has pressure applied thereto to move the piston thereof to shaft a detecting finger 178, Fig. 8, radially towards a film spool at the winding station. If the film has been properly wound, the end 179 of the finger 178 will move into engagement with the outer convolution of film on the film spool. The detecting finger 168 will then indicate that a satisfactory spool is at the winding station 121, and the cycle is allowed to continue. However, in the event that there is no film or insufficient film on the spool at the winding station, the finger 168 will move in an additional amount. This additional movement will be sufficient to open a switch, not shown, arranged in the electrical circuit of the machine to stop the latter.

As mentioned above, the sprocket 119 of the film threader 120 is rotated to draw the film from the stock roll cabinet 115 through the chopper 116, edge printer 118, and to feed the film through the guide 122 to the film spool 102 positioned at the winding station 121 (station 4). This sprocket is first rotated to move the film to bring the leading edge 123 into a position adjacent the film spool, and the sprocket is then stopped to arrest the film movement. Then, the tape squeezers 125 are moved inwardly to bring the tape into engaging relation with the film to connect the latter to the spool. The sprocket is again started and rotated to feed a definite length of film, and the spool is independently rotated to wind up the feed film. After the winding operation is completed, the sprocket and the spool are stopped and the end 124 is then gripped by the members 127.

To secure the sequence of operation of the sprocket 119 a film measuring unit, broadly designated by the numeral 180 is provided, see Figs. 9, 10 and 11. This unit is designed to feed an unitial short length at slow speed until the leading end 123 of the film is positioned adjacent the film spool at the winding station. Then, as above described, the tape squeezers move in to secure the tape to the film end. Then the unit is run at high speed to feed the required length of film to complete the spool.

To secure this result, the shaft 181 of the sprocket 119 extends through the main panel 113 and has mounted on the rear end thereof a hydraulically driven gear motor, broadly designated by the numeral 182. The latter is connected by a gear train, see Fig. 11, to a shaft 183, on which are mounted a detent wheel 184, a cam 192, as best shown in Figs. 10 and 11. The shaft 183 extends through the panel 113 to the front thereof and has mounted thereon a pulley 186 which is connected by a belt 187 to the edge printer 118 to drive the latter, see Fig. 3. Referring to Fig. 10, it is seen that the detent wheel 184 is formed with two adjacent detents 187 and 188 with which a stop dog linkage or pawl 189 is adapted to cooperate. The dog 189 is connected to a cylinder 190. The arrangement is such that at the start of the winding operation the pawl 189 is positioned in detent 187. Now, as the film winding operation starts, pressure is applied to cylinder 190 to move dog 189 out of the detent 187 to permit motor 182, drive shaft 181 and hence sprocket 119 to move the film. Immediately thereafter pressure is taken off cylinder 190 and an internal spring therein, not shown, moves the dog 189 into engagement with the periphery of wheel 184. Now, when the initial short length of film has been fed, the dog registers with the second detent 188 and drops therein to stop rotation of the sprocket 119 to enable the squeezers 125 to press the tape against the film.

The detents 187 and 188 are spaced a distance such as to enable the correct initial length of film to be fed. After the tape 105 has been connected to the film, pressure is again applied to cylinder 190 to withdraw dog 189 from detent 188 to enable motor 182 to rotate shaft 119 to feed the proper length of film to the spool. After the dog is withdrawn from the detent 188, pressure is taken off the cylinder 190 and the spring therein moves the dog into engagement with the periphery of the wheel 184. The dog 189 rides on the wheel until the proper length of film has been wound, at which time the dog again registers with and drops into the initial detent 187 to stop shaft 181 and hence sprocket 119. Thus, the wheel 184 permits the initial small movement of the sprocket to feed the initial film length, then stops the sprocket to permit attaching of the film to the spool, then allows the additional movement of the sprocket to wind the measured film length onto the spool.

The initial feeding of the film to the spool is performed at one speed, and the winding of the film is at a higher speed. To secure this speed variation, a cam 192 is also mounted on a shaft 183 in front of the detent wheel 184, as best shown in Fig. 11. The motor 182, wheel 184 and cam 192 are all enclosed in a suitable housing 194, see Fig. 11. Fluid pressure is supplied to line 191, Fig. 10, from a line 195 through a control valve 196 mounted on the top of housing 194. The valve 196 is, in turn, connected to line 191 through a line 197. The flow of fluid through valve 196 is controlled by the cam 192 by means of a speed control lever 198, Fig. 10, which is in the form of a bellcrank pivoted at 199 on the housing 194. One arm of the bellcrank is provided with a cam follower 200 which rides on the cam periphery, as clearly shown in Fig. 10. The other arm of the lever 198 carries an adjustable screw 201 which engages the end of a spring press plunger 202 of control valve 196. The arrangement is such that during the initial feeding of the film, the follower 200 rides on the low portion 202 of cam 192 to feed a small amount of oil from line 195 through valve 196 to lines 197, 191 to the motor 182 to rotate the latter at the desired low speed. However, after the film has been attached to the spool by means of the tape 105, the motor 182 starts up and rotates cam 192. The follower 200 moves along the low portion 202 and then along the rise 203 to gradually increase the sprocket speed until follower finally engages the high portion 204 of the cam and the sprocket is now driven at high speed. The follower rides on the high portion 204 during the greater part of the winding operation to maintain the high winding speed. Near the end of the winding operation, follower 200 finally engages a fall-off portion 205 which decreases the sprocket speed until the dog 189 finally drops into detent 187, at which the sprocket 119 is stopped. During the time that the follower rides on the high part of the cam, the valve 196 is open an amount sufficient to supply additional oil or fluid to the motor 182 to rotate the latter at the desired high speed.

Each cam and detent wheel arrangement is designed for a definite length of film. In order to adapt the apparatus for winding different lengths of film, the cam and detent wheel are removably mounted on shaft 183. To this end, the cam 192 and wheel 184 and its associated gear 206 are removable as a unit and a new unit placed on the shaft 183. To secure this result, the unit is held in place on a shaft by means of a screw 207, so that merely by removing the screw 207 one unit may be removed and another unit substituted therefor, as is deemed apparent from Fig. 11.

The rotor 148 is mounted on a hollow shaft 225, see Fig. 8, which extends through the panel 113. The rotor carries eight equally spaced headstocks 140 of the type shown in Fig. 8 and above described. In addition, the rotor carries eight pairs of film grippers 127, each pair being associated to a headstock 140 as best shown in Fig. 7. As mentioned above, the rotor 148 is indexed 45° counterclockwise, as shown in Fig. 7, between each operation.

Figure 12:
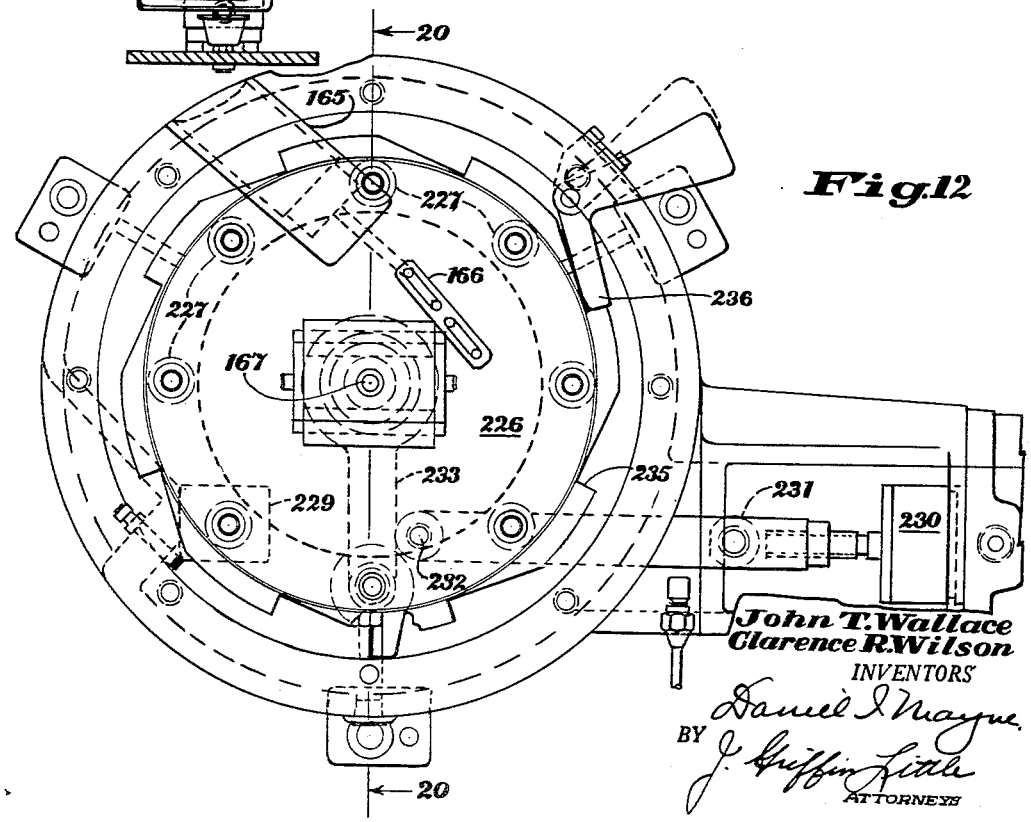
Fig. 12 is another partial view of the mechanism illustrated in Fig. 9 showing the rotor indexing mechanism.

The rotor indexing mechanism comprises an indexing disc 226, Fig. 12, carried by shaft 225 behind the panel 113 as shown in Fig. 20. This disc is provided with eight equally spaced holes 227, Figs. 13 and 20, to correspond with the eight headstocks 140. When the rotor is stationary a retractable locking bolt 228, Fig. 13, positioned at the back of the disc 226 engages in one of the holes 227 to hold disc 226 against movement. Now, when the rotor 148 is to be indexed 45° the bolt 288 is first withdrawn. To secure this result, pressure is applied to the bottom side of the cylinder 229, Fig. 9, to move the piston thereof to draw bolt 228 from its registering hole 227. After the bolt is withdrawn, pressure is applied to the right end of the indexing cylinder 230, as viewed in Fig. 9. The connecting rod 231 of cylinder 230 is connected at 232, Fig. 12, to an index crank 233 loosely mounted on shaft 225. The free end of crank 233 carries a spring loaded carriage bolt 234 positioned on the front side of disc 226, Fig. 20. Now, as pressure is applied to the right side of cylinder 230, the crank 233 is rocked clockwise, as viewed in Fig. 12, to move disc 226 45°. At this time, the carriage bolt 234 is brought into registry with the locking bolt 228. Just before such registration, pressure is applied to the back of cylinder 229 to move bolt 228 inwardly to ride on the surface of disc 226. When locking bolt 228 and carriage bolts 234 are in registry, the locking bolt 228 enters the registering hole 227 to force carriage bolt 234 therefrom, see Fig. 20, to free indexing crank 233 and lock the disc 226.

Pressure is then applied to the left end of cylinder 230, Figs. 9 and 13, to move crank 233 and bolt 234 to their initial position, the bolt 234 riding on the surface of disc 226 until the bolt 234 is in registry with the bottom hole 227 whereupon bolt 234 snaps into the hole to be ready for the next indexing operation. After the bolt 234 drops into the bottom hole 227, pressure is taken off cylinder 230. Thus, the rotor has been indexed 45° to bring a new spool to each of the stations on the rotor, the purpose of which will be later described. Each subsequent indexing of the rotor moves a spool to the next station and supplies a new spool to the initial station of the rotor. At certain of the stations specific operations are performed in the formation of the final magazine, as will be later more fully described. The periphery of the indexing disc 226 is formed with a plurality of ratchet teeth 235, Fig. 12, which are engaged by the gravity-held pawl 236 to hold the disc 226 against any possible reverse movement.

Figure 14:
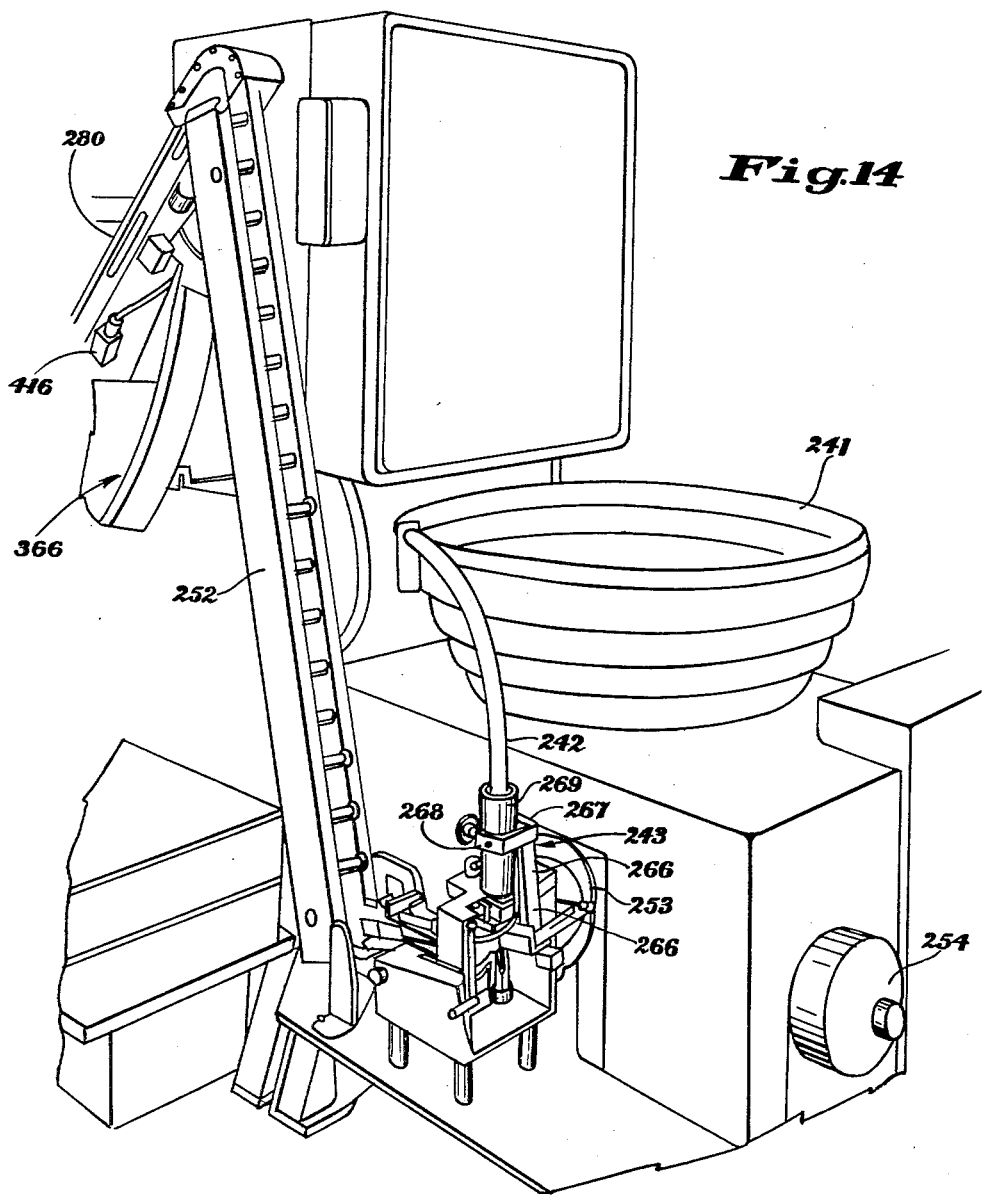
Fig. 14 is a view of a right end of the machine illustrated in Fig. 3, showing the spool feeding and orienting mechanisms.
Figure 15:
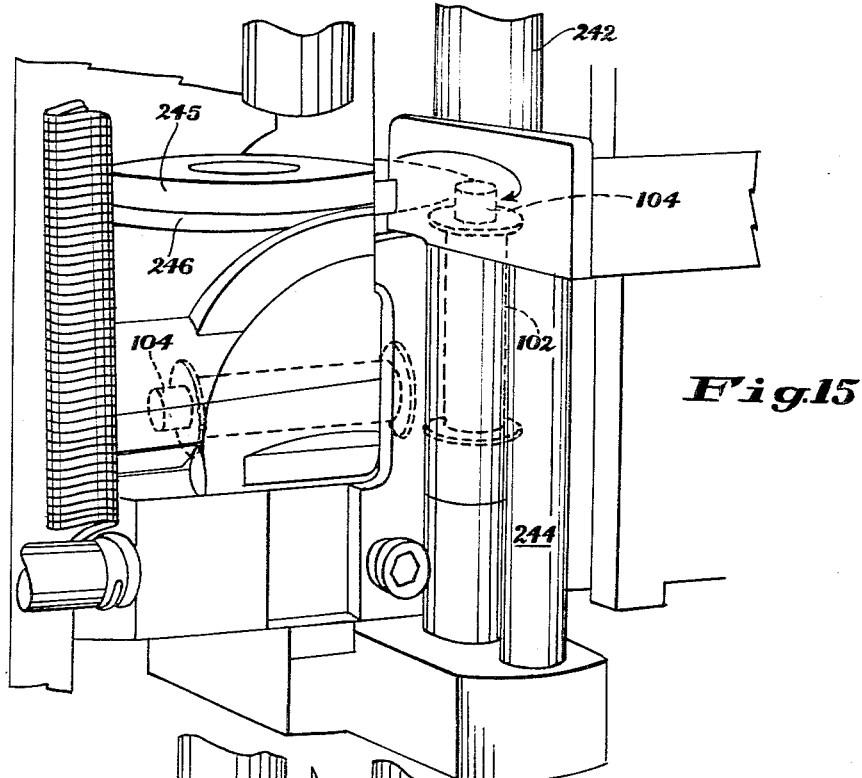
Figs. 15 and 16 are end views of the spool orienting mechanism, showing the apparatus for tipping the spool in opposite directions for orienting the spool.
Figure 16:
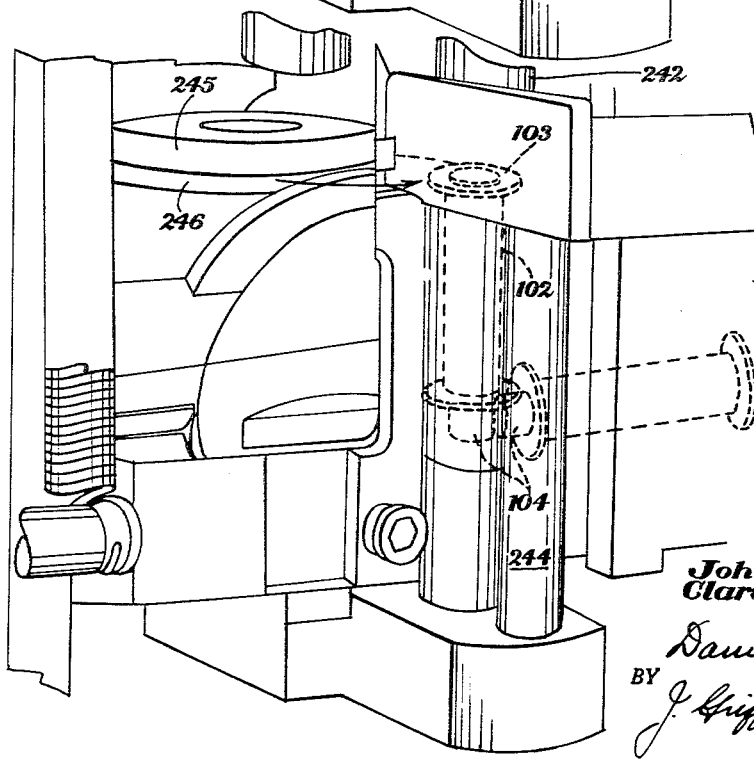

A supply of spools 102 are dumped into a vibratory feed hopper 241, Fig. 14, which is a commercially available unit and forms no part of the present invention. This hopper is provided with an internally inclined track along which the spools feed upwardly in end-to-end relation as the hopper is vibrated. When a spool finally reaches the top of the inclined track the spool falls through a delivery tube 242 to a spool orienting mechanism, generally indicated by the numeral 243, Fig. 14. As is apparent from an inspection in Fig. 2, the spool 102 has a hub 104 formed on one end thereof. As the spools are fed by the hopper 241 and tube 242 to the device 243, the spools may be arranged with the hub 104 up, as shown in Fig. 15, or with the hub down, as shown in Fig. 16. In order that the spooling machine will operate as intended, it is imperative that all the spools be oriented so that the hub 104 is arranged outermost from the machine or to the left as viewed in Figs. 3 and 14. The device 243 serves to thus position or orient the spool irrespective of the direction of feed to the device 243. The spool is accurately positioned firmly in the orienting means 243 by a pair of vertical guide rods 244. To secure this spool orienting, a pair of arcuate arms 245 and 246 of the shape best shown in Fig. 17 are mounted on a shaft 247 which extends through a housing 248. The arms are positioned one above the other, the arm 245 being the upper and arm 246 being the lower. These arms 245 or 246 are adapted to engage either the hub 104 or the opposite spool flange to tip the spool as indicated in Figs. 15 and 16. The particular direction of tipping depends on the arrangement of the spool in the device 243. For example, when the spool is in the position shown in Fig. 15, the rocking of shaft 247 will cause the upper arm 245 to engage the hub 104 to tip the spool to the left, the hub then being arranged to the left side of the horizontally arranged spool. On the other hand, if the spool was arranged as shown in Fig. 16, the top arm 245 will clear the spool flange 103 on the end of the spool opposite the hub 104 when the shaft 247 is rocked. Now, on the return movement of the shaft 247 the lower arm 246 will engage the uppermost flange 103, Fig. 16, and will tip the spool to the right, the hub 104 being positioned to the left as shown in Fig. 15. Thus, whether the spool is in the position of Fig. 15 or that of Fig. 16, the spool will be arranged or oriented horizontally with the hub 104 to the left. The tipped spools are directed down a pair of tracks 249 and 250 and merge into a single track 251 at the base of an elevating mechanism 252 which elevates the oriented spools, each of which is arranged with the hub 104 directed outwardly from the machine.

To rock shaft 247, a cam 253 is rotated by a motor 254, Fig. 14, which also drives the hopper 241 and elevator 252. As the cam 253 rotates it vertically oscillates a member or arm 254 through a suitable linkage, not shown. As such a linkage is well known and forms no part of the present invention, details are not shown. The upper end of arm 254 is connected at 255 to one end of bellcrank lever 256 pivoted at 257 on the housing of the orienting device. The other arm of the bellcrank 256 is pivotally connected at 260 to an eccentric 261 carried by shaft 247. Thus, rotation of cam 253 imparts a vertical reciprocation to arm 254, which, in turn, imparts a horizontal oscillation to shaft 247 and arms 245 and 246 to tip the spools, as above described.

In order to insure the feeding of a single spool at a time into position to be tipped by arms 245 and 246, the present invention provides an escapement mechanism which comprises, in general, a pair of vertically spaced fingers 262 and 263 which extend through openings 264 and 265 into the housing 248, as best shown in Fig. 17A. These fingers are carried by a tie bar 266, the upper end of which terminates in a yoke member 267 which extends partially around and is pivoted at 268 on opposite sides of a lower enlarged portion 269 of 242. The lower end of tie rod 266 has attached thereto one end of a horizontally extending bar or arm 270, the other end of which carries a cam follower 271 which rides on a cam 272 secured to the same shaft as cam 253, as seen in Figs. 17A and 18.

As the cam 272 is rotated, bar 266 is rocked about its pivot 268. Such rocking serves first to withdraw the lower finger 263 out of supporting relation with lowermost spool in tube 248 to allow the freed spool to drop below the orienting fingers 245 and 246, the upper finger 262 serving to support all the spools thereabove. However, further rocking of the bar 266 finally withdraws the upper finger 262 out of holding relation and allows all the spools in tube 242 to drop down. At this time, the cam follower 271 is riding on the high point of cam 272. Further rotation of cam 272 brings a low point thereof into cooperating relation with the cam follower 271. A coil spring 273 has one end anchored to bar 270 and the other end secured to machine frame and now moves the bar 270 and 266 to shift the upper finger inwardly. The parts are so designed that inward movement of the upper finger 262 will engage the second spool so that only one spool is allowed to drop upon actuation of the fingers. After the lower spool has been released by the upper finger 262, the lower finger 263 is moved in at the proper time to be positioned under and support the released spool. Thus, the spools are fed one at a time from the tube 242 to orienting position.

From the elevator 252 the oriented spool will be delivered to downwardly inclined chute 280, see Figs. 3, 7 and 14. Upper and lower detent fingers 281 and 282, Fig. 7 respectively, are associated with chute 280. These fingers cooperate to feed one spool at a time to the lower end of chute 280. With the spools 102 in the position shown in Fig. 7, the upper detent 281 holds a supply of spools in the upper portion of the chute. When a spool is to be fed, the lower detent 282 is moved in and the upper detent is withdrawn and the supply of spools in the chute roll down and are supported on the lower detent 281. The detents are spaced one spool distance apart. Now to feed a spool to the lower end of the chute 280, the lower detent 282 is withdrawn and, simultaneously, the upper detent 281 is moved in thereon, freeing the lower spool in the chute. Now, the freed spool rolls down the chute to a position to be picked up by the rotor 148 at Station 1.

As mentioned above, the rotor 148 is indexed counterclockwise 45°. This indexing serves to bring a headstock 140 to Station 1 and into alignment with the lower end of chute 280. After the headstock reaches station 1, the rotor is stopped and the headstock is retracted. Substantially simultaneously therewith a spool is released and rolls down the chute 280 into position to be picked up by the headstock at station 1. In order to retract the headstock, the latter has formed on the inner end thereof a radial flange 283 which is positioned behind the rotor or to the right thereof, as viewed in Fig. 8. A boss 284 is formed on the inner end of plunger 285, Fig. 8. The actual plunger shown in Fig. 8 is at Station 7, to be later described, but an identical plunger arrangement is also positioned at Station 1. Now, when the cylinder 286 has pressure applied thereto, the connecting rod is moved upwardly to rock a bellcrank pivoted at 289. The lower arm 290 of the bellcrank is positioned between a pair of shoulders 291 on the plunger 285 to shift the latter rightwardly, as viewed in Fig. 8. This rightward movement will bring boss 284 into engagement with flange 283 to retract the headstock at Station 1. As the headstock is retracted, a vacuum cylinder 291, Fig. 9, has fluid pressure applied thereto to move vacuum valve stem 292, Fig. 8, inwardly to cut off vacuum supply line 293 to the headstock at Station 1. At this time, the lower detent 282 is holding the spools back in 280. A hydraulic cylinder 294, Fig. 9, operates both detents 281 and 282 simultaneously to move the upper detent in and the lower detent out to release the bottom spool in the chute 280. The freed spool then rolls freely to the end of chute 280 and into alignment with the headstock.

Now, hydraulic pressure is removed from cylinders 291 and 286. A coil spring, not shown, positioned within the headstock serves to move the latter outwardly and into contact with the film spool at the end of the delivery chute. Also, vacuum is applied to the headstock to hold the spool thereon by releasing fluid pressure on 294.

Now, the rotor is indexed 45° to move the headstock with its attached spool to Station 2 where the adhesive coated tape 105 is applied to the spool core. The tape 105 is supplied from a stock roll 300, Fig. 3, and is passed, adhesive side down, under an idler roller 301, Figs. 3 and 19, and to a measuring drum 302 carried by a shaft 303. The rotation of the measuring drum is controlled from a cylinder 304, Fig. 9, which is connected to shaft 303 by a linkage 305. The arrangement is such that when fluid pressure is applied to the bottom of cylinder 304, Fig. 9, the shaft 303 and drum 302 are rotated to feed and measure off the proper length of tape. The rotation of the drum feeds the tape through a guide 306 to a vacuum box 307. As the adhesive surface of the tape is against the drum 302, the tape may tend to stick to the drum surface. To prevent such sticking, the present invention provides a stripping roller 308 carried on the end of an arm 309 secured to a shaft 310. The roller 308 cooperates with the adjacent portion of the guide 306 to guide the tape away from the drum to prevent the sticking of the tape thereto. The vacuum box 307 has formed on the front surface thereof a series of vacuum openings, not shown, which hold the tape against the box with the adhesive side out. The lower end of box 307 is rockably mounted on a shaft 311 which extends through panel 113 and is connected by a gear train to cylinder 312, Fig. 9. During the feeding of the tape, vacuum is off the box 307. However, when the feeding is completed, vacuum is applied to the box to draw the length of tape thereagainst. Vacuum to the box 307 is controlled by a vacuum valve 313, Fig. 9. The tape is stretched tightly between the vacuum box 307 and the drum 302. Then a cylinder 314, Fig. 9, is connected through a linkage 315 to a shaft 316 which, in turn, is connected by a linkage 317, Fig. 19, to a movable knife member 318 which cooperates with a stationary knife member, not shown, but of any suitable construction, to sever the tape 105 just above the box 307, as is apparent from Fig. 19. The severed tape is held on the front face of the box by the vacuum applied thereto.

Before the tape 105 is transferred from the box to the spool, a tailstock 319, see Figs. 7 and 19, is moved into engagement with the hub end of the spool and cooperates with the headstock 140 on the rotor 148 to support the spool firmly at Station 2 in the manner above described in connection with Station 4. Now, the spool is firmly held at Station 2 between the headstock 140 and the tailstock 319. The tailstock 319 is rockably mounted at its upper end at 320, Fig. 7. To rock the tailstock 319 into engagement with the spool, pressure is applied to a cylinder 321, Fig. 9, which through a link 322 pivots arm 319A about pivot 320. When the tailstock is to be moved away from the spool, pressure is taken off cylinder 321 and an internal spring therein swings tailstock 319 about pivot 320.

The cut length of film is held by vacuum on the front face of box 307. Now, as cylinder 312 has pressure applied thereto it will swing box 307 along the dot and dash line, Fig. 19, to apply the tape to the spool 102. The central portion 106 of the tape is wrapped about 180° round the spool core while the ends of the tape project substantially tangentially and in a diverging relation, as shown in Fig. 19. In order that the portion 106 may be wrapped around core 101, the vacuum box is formed with a complementary recess 323 which fits over core 101 when the box 307 is swung down. After the tape has been applied the vacuum is turned off box 307 then fluid pressure at the other end of cylinder 312 serves to rock box 307 clockwise about shaft 311 to the position shown in Fig. 19. In addition, the movable blade 318 is retracted. It has been found that during the tape severing operation, the tape may stick to the movable blade member. Before the next tape feeding operation, the tape must be disengaged from the knife so that it may be fed to the vacuum box; any suitable means may be provided for this purpose. However, in the present invention the tape is disengaged by imparting a slight reverse rotation to the measuring roll 302. Now, the tape has been applied to the spool, the rotor 148 is indexed 45° counterclockwise to move the spool with its tape to station 3.

As the spool with its attached tape approaches station 3 the spool passes between a pair of curved spring or flexible stationary arms 324, see Fig. 4. The curved arms engage and wipe the protruding ends 107 of the tape and bend the latter to the position shown in Fig. 4 so that the tape is substantially U-shaped with the ends 107 substantially parallel, as shown in Fig. 5. These arms 324 are carried by the threader 120, as clearly illustrated in Fig. 4. After the tape has been thus shaped at Station 3, the rotor 148 is again indexed 45° counterclockwise to bring the spool with its tape to station 4 to receive and wind the film, as above described.

After the film has been wound onto the spool at station 121 (station 4), in the manner above described, the rotor 148 is again indexed 45° counterclockwise to move the wound spool with the grippers 127 clamped to section 124 of the film to station 5. At this point, no operation is performed. However, on the next 45° indexing of the rotor, the spool with its wound film is moved to station 6 where a retort 108 is slipped over the wound spool.

The retorts 108 are supplied in random fashion to a storage bin 330 positioned in front of the machine in a position available to the operator, as shown in Fig. 3. At this point, the retorts 108 already have the end cap 110 applied thereto so that the retort appears as shown in Fig. 2. The retorts 108 are hand loaded from the bin 330 onto a conveyor 331 positioned just above the bin 330, as best shown in Fig. 3. In placing the retorts on the conveyor, each retort is arranged with the end cap 110 positioned outwardly or towards the operator so that the open end of the retort is directed towards the rotor. The conveyor comprises a pair of laterally spaced endless chains 332 which pass over an idler sprocket, not shown, at the left end of the conveyor and over a drive sprocket 333 in the right end of the conveyor, as shown in Figs. 7 and 21. The chains 332 are connected by a series of cross bars 334, one of which is shown in Fig. 21. Each cross bar 334 has secured thereto, by screws 335, or other suitable fastening means, a flat member, broadly designated by the numeral 336. The right end of each member 336 has attached thereto, in any suitable manner, a guide block 337 in the form of a permanent magnet to hold each retort in position on the conveyor as the latter is moved to the right, as viewed in Figs. 3, 7 and 21.

This rightward movement of the conveyor is in the form of intermittent indexing steps. To secure this result, fluid pressure is applied to cylinder 338, Fig. 9, and this cylinder is connected by any suitable linkage, a part of which is shown at 339, Fig. 21. The member 339 has pivotally mounted thereon at 340 a bar, not shown, which engages a ratchet 341 attached to or formed integral with sprocket 333 to rock the latter intermittently. Such actuation of the sprocket 333 moves the conveyor 331 the distance between adjacent cross bars 334 to move a retort to a retort loading station 341. At this station a loading plunger 351 serves to move an aligned oriented retort off its supporting member 336 and over a wound film spool supported by a headstock or rotor 148 at station 6.

However, before the retort is moved off the conveyor, it is necessary that the retort be oriented so that the space between the retort lips 112 are in horizontal alignment with the portion 124 of the film which is still clamped by the members 127. This retort orientation is performed while the conveyor 331 is stationary and on the retort just ahead of the loading station 341. To this end an internal spring in cylinder 342, Fig. 9, moves the piston thereof which, through any suitable linkage, rocks shaft 343, Fig. 21. This shaft has secured thereto a radial arm 344, the free end of which is formed with a gear sector 345 which meshes with a gear 346 carried by a shaft 347 to rock the gear 346 counterclockwise when the cylinder 342 is actuated by its spring. The gear 346 has formed thereon or secured thereon a ring 348 from which extends an L-shaped orienting lever 349 which overlies the retort positioned ahead of the loading station 341. Each actuation of the piston cylinder 342 by its spring will rock the gear 346 and lever 349 counterclockwise as viewed in Fig. 21. Such movement will cause a guide strip 350 on lever 349 to engage lips 112 of the retort to rock the latter counterclockwise to the position occupied by the two retorts at the left in Fig. 21. These two retorts have been purposely placed in oriented position for illustrative purposes only. It is a general practice to place the retorts on the conveyors with the lips 112 in the general oriented position so that only a slight counterclockwise movement is necessary by the strip 350 of the lever 349. Thus, each retort is oriented when it reaches the loading station 341 so that the lips 112 are in alignment with the part 124 of the film strip when the retort is slid inwardly or to the left, as viewed in Fig. 21, in which case the lips 112 are passed over the film portion 124 to allow the retort to be slid over the wound film spool.

After the retort has been oriented, fluid pressure is applied to cylinder 342, Fig. 9, to return the parts to their initial position for the next orienting operation.

Substantially simultaneously with the rocking of the retort ahead of station 341, the retort at the station 341 is pushed inwardly by a loading plunger 351 from the conveyor and over the wound film spool, as above described. Just before the plunger 351 moves inwardly to shift the retort off the conveyor, a wedge, not shown, moves between the retort lips 112 to spread the lips to permit uninterrupted passage thereof over the film portion 124. However, before the end cap 110 reaches the wedge, the latter is withdrawn from between the lips to prevent the wedge from engaging the end cap, the disadvantages of which are deemed apparent. In order to insure proper alignment of the retort while the latter is being moved from the conveyor over the spool, a small platform or support, not shown, and located in front of the rotor 148 but behind the conveyor 331 is moved up to support the retort as the plunger 351 slides the retore over the wound spool. This platform is slightly higher than the conveyor 311 to compensate for the difference in diameters of the main cylinder body and the end cap 110 of the retort. The wedge and platform may be operated by any suitable means controlled by cylinder 352, Fig. 9, and in timed relation to the inward movement of the retort over the film spool. After the retort has been positioned over the wound film spool, the plunger 351 is withdrawn and the platform lowered to allow the rotor 148 to be indexed to the next station, which is station 7. The plunger 351 is carried on the inner end of a hollow ram 353 which is slidably supported for axial movement on the shaft 354, see Fig. 21. To move the ram 353 and plunger 351 inwardly, pressure is applied to cylinder 355, Fig. 9, to move the piston thereof. The latter is connected by a link 356, Fig. 21, to a point 357 on the arm 358 which is pivoted at 359 below arm 356. The result is that when the piston is moved, the arm 358 is rocked about its pivot point 359. The upper end of arm 358 is bifurcated as shown at 360 to receive a pin on a block 361 secured to and movable with the ram 353. Thus, movement of the piston of the cylinder 355 is transmitted to reciprocate the ram 353 and the plunger 351. After the retort has been loaded on the wound spool, the ram 353 and plunger 351 are withdrawn or retracted to the outer or inoperative position shown in Fig. 21.

After the retort has been applied to the wound spool at station 6, the rotor is again indexed to move the rotor 45° clockwise to station 7, which is designated as the capping station.

A supply of end caps 111 is dumped in a hopped 365, Figs. 3 and 23, of a cap orienter or sorter, broadly designated with the numeral 366. This sorter comprises a sorter disc 367 the front face 368 of which is exposed to the hopper 365 and is provided with a plurality of annularly arranged pockets or recesses 369, each of which is adapted to receive one cap only. In order to retain the cap in the pockets 369, the disc 367 is inclined from the vertical towards the panel 113, as best shown in Fig. 3. As the disc 367 is rotated counterclockwise, Fig. 3, the recesses 369 move into the hopper 365 to receive end caps 111. However, each recess may not pick up a cap, but the speed of operation of the disc 367 is sufficient to supply sufficient caps for the spools on the rotor. Figs. 24 and 25 show the relation of the end cap to the recess 369, in Fig. 24 the end cap being properly oriented relative to the recess, while in Fig. 25 the cap is improperly oriented and is ejected by means to be presently described. In order for the end cap to be applied to the retort 108 in a manner to be later described, the end cap must be positioned as shown in Fig. 24. However, if the cap is improperly positioned as shown in Fig. 25, it must be rejected before the cap reaches the retort at station 7. Preferably the cap is ejected from the disc 367. To this end, a spring loaded plunger 370 is positioned in association with each of the recesses 369, in the manner shown in Figs. 24 and 25. Each plunger has the end 371 extending into the recess 369 and of a diameter slightly less than that of rim portion 372 of end cap 111. The result is that if the cap is properly oriented as shown in Fig. 25, leftward movement of the portion 371 will not engage a part of the cap inside the rim 372 and the cap will not be rejected. However, if the cap is improperly oriented as viewed in Fig. 25, the flat face 373 of the cap is against the disc so that leftward movement of the portion 371 will cause the latter to engage the cap and eject the latter from the recess 369, as shown by the dotted lines, Fig. 25. The outer end of the plunger 370 is provided with a rounded or cam portion 374 which moves into contact with a fixed member such as a ball bearing 375 to move the plunger 370 and portion 374 inwardly or to the left, as viewed in Figs. 24 and 25 to eject the improperly oriented cap. The rejected caps fall back into hopper 365 and are later picked up by another recess. If the caps are properly oriented in recesses 369, the counterclockwise rotation of the discs 367 moves the caps over the top end of a chute 376 and the cap is dropped out of the recess and into the chute. If, however, the chute is full, the caps merely drop back into the hopper 365. The lower end of the cap chute 376 is provided with a pair of spring actuated members 377 which yieldably position and hold the lowermost cap 111 at the bottom end of the chute 376, as best shown in Figs. 22 and 26.

After the retort with its wound film spool has been positioned at station 7, the retort and spool are moved downward from the rotor. Such movement serves to bring the uncapped end of the retort into engagement with the lowermost cap 111 in chute 376 to apply the cap 111 to the retort to complete the closure of the latter. The complete magazine then drops into a suitable delivery chute, not shown, and acceptable and non-acceptable magazines are sorted and directed to separate receptacles. In order to remove the complete magazine from the rotor, the present invention provides a removable device, broadly designated by the numeral 380, Fig. 27. When the rotor is indexed to Station 7, this device is in the dotted line position shown in Fig. 27. In this position, a pair of jaws 381 carried on the free end of arm 382 pivoted at 383 is arranged on opposite sides of the retort, see dotted line position Fig. 27. The first step is to close the jaws 381 to grip the retort by applying pressure to cylinder 384, Fig. 9. Through linkage 385 a gear 386, Fig. 27, is rotated. Gear 386 meshes with a gear sector 387 to rock the latter clockwise as viewed in Fig. 27, and also a cam 388 which is attached to gear 387 the latter and the cam being loosely mounted on shaft 383. Thus, when pressure is applied to cylinder 384, gear sector 386 and cam 388 are rocked clockwise, Fig. 27. A cam follower 389 carried by an arm 390 rides on cam 388. When the parts are in the dotted upper position, see Fig. 27, the follower 389 is on the low part 391 of the cam 388. As cam 388 is rotated clockwise the follower rides from the low point 391 to the high point 392. Arm 390 is pivoted at 393 so that as the follower 389 rides onto the high point 392 of cam 388, arm 390 is rocked counterclockwise about pivot 393. A lower link 394 is pivoted at one end at 395 to arm 390 and has the other end connected to the right jaw 381. An upper link 396 is pivoted at one end at 397 to arm 390, and the other end is pivoted at 398 to link 399, the lower part of which forms the left jaw. Now, as the arm 390 is rocked counterclockwise about pivot 393, links 394 and 396 are moved to the left to close the jaws to grip the retort. The left jaw 381 is spring loaded by means of a spring 400 in link 396 to provide a yieldable connection between cam 388 and jaws 381 so as to hold the jaw 381 in tight retort clamping relation to prevent breakage of parts. After the retort is gripped by jaws 381, film grippers 127 are opened by cylinders 165, Fig. 9, through cam 168, Fig. 7, to disengage the film portion 124.

Thus, the rotation of cam 388 has closed the jaws to grip the retort. Now, the vacuum is taken off the headstock 140 at station 7 by releasing the pressure on the cylinder 229, Fig. 9, which is similar to cylinder 291, Fig. 9. The next operation is to withdraw or retract the headstock 140 at station 7. This mechanism is illustrated in the upper part of Fig. 8 and has been previously described. The retort is now free and is held only by means of the jaws 381. Pressure is then applied to the top of cylinder 401, Fig. 9, and relieved at the bottom. The piston of cylinder 401 then moves down, as viewed in Fig. 9, and through link 402 to rock shaft 383 to move arm 382 downward from the dotted position to the solid position shown in Fig. 27. Such downward movement of the arm 382 carries the retort downward therewith, as seen in Fig. 26 and the lower edge of cap 111 which is held by the springs 377 in chute 376 engages the lower edge of the retort, as illustrated in Fig. 26. This catching of the cap on the retort is possible as the cap is inclined relative to the retort, as clearly illustrated in Fig. 26. The retort with the caught cap passes downward and the cap is wedged between the retort and the anvil 403, the latter serving to tip and apply the latter over the open end of the retort.

During this capping operation, the follower 389 has been riding on the high point 392 of cam 388 to maintain the jaws 381 in closed position to grip the retort. After the capping operation has been completed, the follower 389 now rides onto another low point 404 of cam 388 and the jaws are opened to release the retort which now drops into the delivery chute. During the downward travel of the arm 382, a ball bearing 405 on the outer or left end of arm 382, rides in the guide 406 to support the arm 382 during the capping operation to prevent any possible deflection during the capping operation. Pressure on cylinder 401 is reversed to carry the arm 382 to its upper dotted position, see Fig. 27. Also pressure is reversed on cylinder 384 and cam 388 rotates counterclockwise to open the jaws 381. Pressure is now released on vacuum cylinder 229, similar to 291, the turn on vacuum on the headstock 140 at station 7. Hydraulic pressure in cylinder 286, Fig. 8, is removed and the internal spring therein moves the headstock to its normal or outer position. The parts are now returned to their operative position and the rotor 148 is again indexed 45° counterclockwise to station 8 at which point no operation is performed. However, the next indexing of the retort returns the retort to station 1 to start a new cycle.

Figure 29:
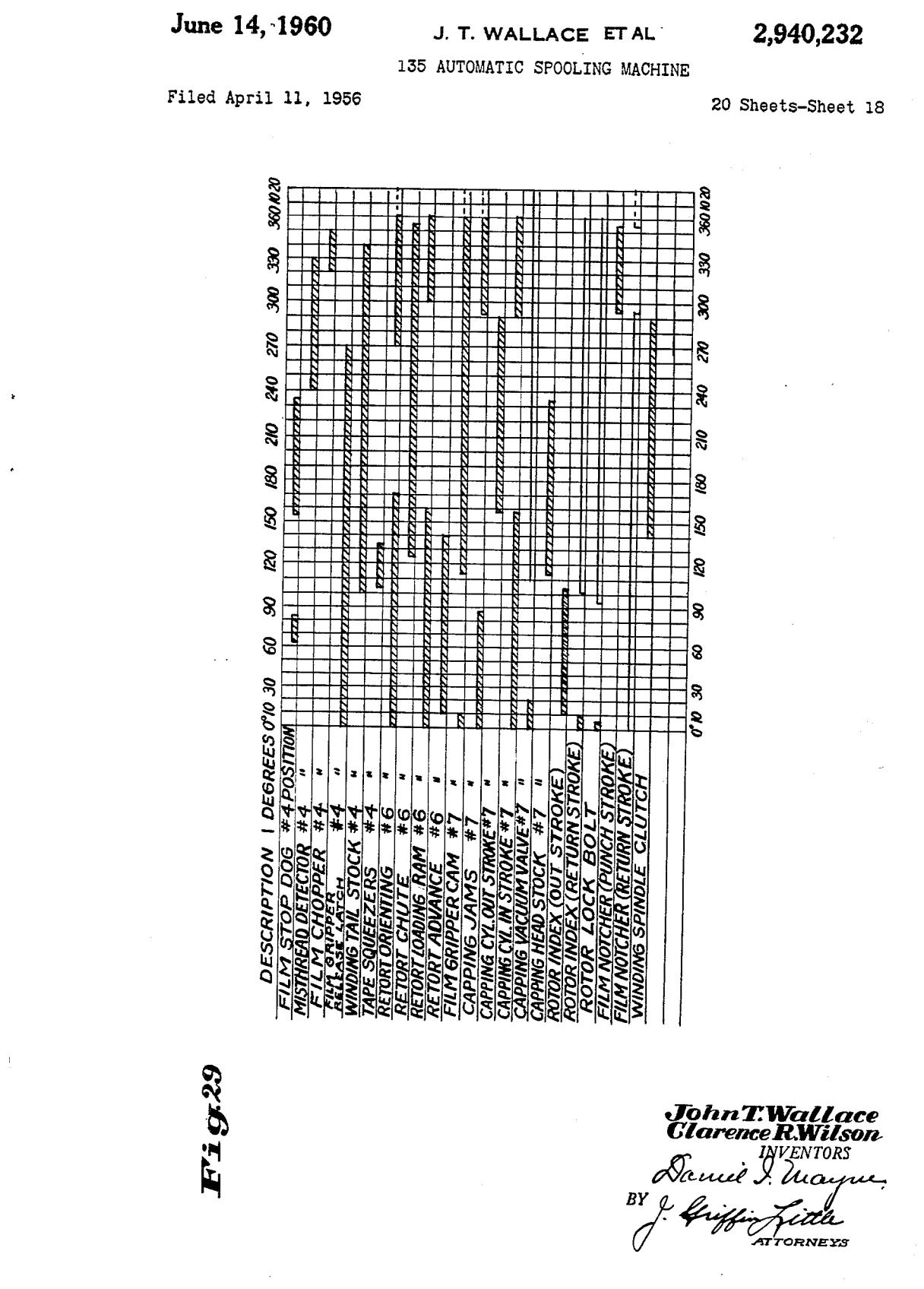

While the above operations have been separately described, they are interrelated and take place in a definite timed sequence, as shown in the cam timing chart, Figs. 28 and 29. The above described fluid cylinders are all controlled in a definite timed relation by a series of cams of the type shown and described in the above-mentioned Edwards et al. patent. Operating mechanisms and cylinders are also similar to those of the Edwards et al. patent, to which references may be had for detailed disclosure. As these elements form no part of the present invention they are not disclosed in this application. While the hydraulic system with its various controlled cylinders is utilized in the winding and assembling of the magazines, various electrical controls and interlocks are also provided to inspect and reject the faulty magazines. The electric controls and circuits are diagrammatically shown in Figs. 30 and 31 and are briefly described as follows:

The system uses the following circuits in accomplishing this mission.

A. Out of Stock Circuits:
    (1) Spool; (2) Tape; (3) Film; (4) Retort; (5) Cap.
B. Assembly Inspection:
    (1) Misthread; (2) Retort Ram Position; (3) Headstock Position; (4) Gripper Open Circuit.

C. Memory Circuit
D. Empty Run Circuit
E. Miscellaneous:
 (1) Temperature Control Circuit; (2) Hysteresis Clutch

OUT OF STOCK CIRCUITS

When stock is exhausted the proper switch is actuated and the machine is stopped before the exhaustive material is needed. The exhausted material is replaced and the machine started. In order the spool, tape, film, retort, and cap circuits are described.

All the circuits that stop the 135 spooling machine, operate through a common control relay 410. When R1 through R7, Fig. 31, or R11 drop out a timing switch 411 is held closed and the machine operates to the end of the end of the cycle. When the cam shaft of the type shown in the above Edwards et al. patent rotates to 325°, the timing switch 411 opens. Relays 412 and 413 open to stop the spool sorter motor and the cap sorter motor. When control relay 410 opens, timing switch 414 holds the circuit to the cam shaft motor closed. When the cam shaft rotates 340° timing switch 414 opens and the relay 415 opens. The cam shaft motor is stopped and the automatic brake applied.

Spool out of stock circuit

Spools are loaded into the spool loading chute 280, Fig. 7, where they roll down toward the rotor 148. The top two switches 416, Figs. 14 and 31, operate the spool sorter motor. A third switch 417, Fig. 30 (not shown in Fig. 14), is between the upper and lower detents 281 and 282, Fig. 7. If no spool is between these detents, switch 417 remains closed. Timing switch 418, Fig. 30, closes at 157°. This lights a "no spool" light and relay R4 contacts open. With R4 open, the circuit described in the preceding paragraph operates to stop the three motors.

If this switch 417 rotates up and the spool is held between the upper and lower detents 281 and 282, the switch will remain open. Since timing switch 418 closed at 157°, the circuit is not complete and R4 is not actuated.

Tape out of stock circuit

Tape is fed onto the applicator arm 307, Fig. 19, and vacuum is turned on at 310° to hold the tape on the vacuum box. If the supply of tape is exhausted the vacuum is broken and a vacuum valve 419, Figs. 9 and 30, is actuated. Timing switch 420, Fig. 30, for switch 419 is still open and the circuit remains deenergized. At 320° timing switch 420 closes and R2 contacts open. The tape light is turned on and R2 opens the circuit, as above described, to stop the three motors.

Film out of stock circuit

Film looper arm, not shown in film cabinet 115, Fig. 3, is held up by the tension from the film. When the film supply is exhausted the looper arm falls closing switch 421, Fig. 30. With this switch closed, the film light is turned on and R1 contacts open. With R1 open the circuit, as above described, operates to stop the three motors.

Retort out of stock circuit

If no retort is at the orienting station, as shown in Fig. 21, switch 422, Fig. 30, closes. The retort light is turned on and R7 contacts open. With R7 open, the circuit described above operates to stop the three motors.

Cap out of stock or no cap circuit

In normal operation, a cap is at the anvil 403, Fig. 26, and the capping arm 382, Fig. 27, rotates down to wipe a cap on the retort. As the cap slides over the anvil 403, switch 423 Fig. 30, is closed and the circuit R3 remains closed when timing switch 424, Fig. 30, opens.

If no cap is at the anvil, switch 423 remains open. When the cam shaft rotates 30° timing switch 424 opens which lights the uncapped light and R3 contacts open. With R3 open the circuit described above operates to stop the three motors.

Capping arm switch 425, Fig. 30, is actuated each time the capping arm 382 rotates down. When R3 contacts open the reject solenoid 428, Fig. 30, operates to hold the switch 425 closed. This reject solenoid 428, opens a reject door, not shown, in the delivery chute and the uncapped retort drops into the reject chute.

INSPECTION CIRCUITS

These circuits include the misthread circuit, the retort ram position circuit, and the headstock position circuit to be presently described.

Misthread circuits

At 240° the misthread lever 178, Fig. 8, moves in to check the diameter of the roll of film. If no film has been wound onto the spool the misthread lever closes the mistread switch 426, Fig. 30. At 260° timing switch 427 closes. This lights the misthread light and R5 contacts open. With R5 open the circuit described above operates to stop the three motors. Before the machine is started loose film or jams must be removed.

Retort ram position circuit

As the retort ram member 353, Fig. 21, pushes the retort over a roll of film, at station 6, the linkage shown in Fig. 21 closes the switch 431, Fig. 30. Timing switch 432 opens before switch 431 closes and the circuit R6 is unchanged. If the retort jams, switch 431 remains open. At 260° of the cam shaft rotation the timing switch 432 closes. This lights the retort jam light and R6 contacts open. With R6 open the circuit above-described operates to stop the three motors. Before starting the machine the jammed retort must be cleared.

Headstock position circuit

As the rotor 148, Fig. 7, indexes, the headstock between stations 2 and 3 is out. If the headstock is in, the winding mechanism will be damaged as the headstock indexes into the winding station 121, Fig. 7. The headstock may be held in because of binding or a broken spring. If the headstock is between stations 2 and 3, the end of the headstock contacts a linkage that closes switch 433, Fig. 31. The headstock position light is turned on and R11 contacts open. With R11 open the circuit described above operates to stop the three motors. Before starting the machine the headstock at station 3 must be freed.

Gripper open circuit

Switch 434, Fig. 31, is actuated by a roller 170 at the end of the grippers 127 at the winding station 121, Fig. 7. If the gripper is open when timing switch 435, Fig. 31, closes at 340°, relay 436 contacts open. The gripper open light lights and 415 opens shutting off the cam shaft motor. If the grippers are closed when timing switch 425 closes, 437 contacts open and the circuit at 415 is closed when timing switch 414 opens at 340° and the cam shaft motor continues to run.

MEMORY CIRCUITS

When a misthread occurs, as above described, the spool at the winding station 121, Fig. 7, has no film. The machine is cleared and the machine started. A hold or memory circuit removes the empty spool from the rotor and the spool falls into a reject side of the delivery tray, not shown.

When misthread lever 178, Fig. 5, finds a spool empty, R5 contact opens in the misthread circuit. Table 1 describes the sequence and resutls of the memory circuit.

TABLE I.—MEMORY CIRCUIT

| Time Misthread Cycle | Degrees of Camshaft Rotation | Operation and Result |
|---|---|---|
| First Cycle after Misthread. | 260 | R5 contacts open when 427, Fig. 30, closes. Relay 438, Fig. 31, is energized. |
| | 265 | Timing switch 439 closes to hold 438 closed. |
| | 180 | 438 contacts are still closed. When 440 closes circuit to relay 441 is complete and 441 contacts open. |
| | 183 | 442 closes to hold 441 closed. |
| | 220 | 439 opens dropping out 438. |
| | | NOTE.—Empty spool is at station 5. |
| Second Cycle after Misthread. | 00 | 441 contacts are still closed. 443 closes and 444 contacts open. Solenoid valve 445 closes and retort chain advance cylinder 338 is blocked off. No retort is advanced to the ram position and when the spool reaches the station 7, the empty spool will not be covered with a retort. |
| | 100 | 441 contacts are still closed. 446 closes and relay 447 contacts open. |
| | 102 | 448 closes to hold 447 closed. |
| | 110 | 443 closes and 444 contacts close. 445 opens restoring hydraulic pressure to retort chain advance cylinder. |
| | 140 | 442 opens dropping out 441. |
| | | NOTE.—Empty spool is at station 6. |
| Third Cycle after Misthread. | | 447 contacts are still closed. No cap circuit is deenergized. 424 closes at 30° but the circuit to stop the machine will not operate with 447 open. Empty spool falls into the delivery tray and the machine does not stop. |

EMPTY RUN CIRCUIT

If the machine is shut down for any reason at all, the materials on the rotors are cleared so that if the machine is again started up, it is necessary to bring the various materials to the proper points otherwise material is fed simultaneously at all stations and the machine would jam. To eliminate this difficulty on starting up with a clear rotor and empty run switch 449 is turned to the empty position so that as the materials are successively fed to the rotor the cooperating materials will not be fed until the material reaches the proper station, at which time the proper operation will be performed in the required sequence.

With the switch 449, Fig. 31, set at "Empty," 450, Fig. 30, closes and the circuit is complete to timing switch 451, Fig. 30. With the machine started the cam shaft rotates to 5° timing switch 451 closes and the stepping relay 452 notches one step forward. Each time the cam shaft rotates to 5° the stepping relay 452 notches one step forward. When contact 7 is reached stepping relay 452 remains there until the empty run switch 449, Fig. 31, is set "Run," 450 drops in and timing switch 451, Fig. 31, is no longer in the circuit. 452 does not operate and stepping relay homing circuit rotates the relay 452 contact No. 1.

The stepping relay 452 holds up film, retort checking circuits until the rotor 148, Fig. 7, needs the material. Table II shows how stepping relay 452 effects the cycle:

TABLE II.—EMPTY RUN CIRCUIT

| 452 Bank | Electric Element or Circuit Effected | Effection Cycle |
|---|---|---|
| 1 | Retort Chain Advance 445 | Contact 1 through 5 hold 444 open through bank 1 of 452, Fig. 31. 445 is held closed, and Retort Chain Advance Cylinder 338, Fig. 9, is blocked off and retorts do not advance. Contact 6, bank 1 of 452 is open. 444 and 445 close. Retort chain advance cylinder 338 is open and the retort advances to the ram. |
| 2 | Film Feed Cycle 454 | Contacts 1 through 3, bank 2 of 452, Fig. 31, are open and 453 remains open. 454 is not energized and the film feed cycle will not operate at the winding station 121 until the rotor 148, Fig. 7, indexes a spool to the winding station. Contact 4 bank 2 of 452 energized 454 through 453 and the film feed cycle opens. Film feeds to the spool at the winding station 121 on the rotor. 453 remains energized through 450 and the film feed circuit operates as long as the empty/run button 449 is on Empty. |
| 3 | No Cap Circuit R3 | Contacts 1 through 6, bank 3 of 452, Fig. 30, are open and the "No Cap Circuit" will not operate while the rotor 148, Fig. 7, is empty. When contact 7, bank 3 of 452 is reached the rotor is full and the "No Cap Circuit" operates as above described to check the first magazine as it leaves the rotor. |
| 4 | Stepping Relay 452 Advance | The first six contacts are closed to hold timing switch 451 in the circuit. With each revolution of the camshaft timing switch 451 notches stepping relay forward one notch. The seventh contact bypasses 451 as shown in Fig. 30. Stepping relay is held at the seventh contact until the empty/run button is set to "Run." |
| 5 | Misthread Circuit R5 | Contacts 1, 2 and 3, bank 5 of 452 are open and the "Misthread Circuit" does not operate until a wound spool is at the winding station 121, Fig. 7. At the fourth contact the "Misthread Circuit" operates to check the first wound spool. Contacts 4 through 7, bank 5 of 452 check the successive spools for film. Contact 7 holds the "Misthread Circuit" closed until the empty/run button 449 is set to "Run." |

Temperature control circuit

The various fluid cylinders of the present invention are supplied from a hydraulic oil sump which is controlled in a manner substantially as shown in the Edwards et al. patent mentioned above.

Hysteresis clutch

The film winding mechanism described rotates the spool as the film feeds from the threader. The rotation is carried through a hysteresis clutch 151, Fig. 4, to the headstock at the winding station. The hysteresis clutch is timed through timing switch 455 and described in connection with Fig. 4.

In series with the hysteresis clutch 151 is an adjustable resistor 456. The resistance of 456 can be changed to vary the current entering the hysteresis clutch. If the current entering the clutch is increased the torque output is increased.

In addition to the specific controls above described, various additional controls, such, for example, as the Strobolight control circuit, and various counters are provided. As these devices are substantially identical to those shown in the Edwards et al. patent, they do not form a part of the present invention and reference may be had to the Edwards et al. patent for details thereof.

The present invention thus provides a machine in which the film is fed to and automatically wound at the winding station. The spools are properly oriented and fed to the indexing rotor which is indexed in a step-by-step relation to move the oriented spools successively to different stations where separate and specific operations are performed. After the film is wound on the spool, the latter is moved to a retort loading station where an oriented retort is slid over the wound spool. The latter, with its retort, is then moved to the capping station where the open end of the retort is capped to complete the magazine. The latter is then delivered to a suitable receptacle. At the winding station the film is first fed to the spool at low speed and the winding is then stopped, and the film attached to the spool, and then the final definite length of film is wound on the spool at high speed. Novel mechanisms are provided to orient both the spools and the retorts. Also, the rotor provides a novel arrangement by which the spools are periodically and automatically moved to the various stations in proper timed relation. The open end of the retort is capped automatically while the spool and retort are held.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What we claim and desire to secure by Letters Patent of the United States is:

1. A machine for assembling roll film magazines, comprising, in combination, a spool supply station, a tape applying station, a film winding station, a retort loading station, a capping station, an indexing rotor movable between said stations, said rotor being positionable to receive a spool at said supply station, means to index said rotor to move said spool from said loading station to said applying station, means at the applying station to apply an adhesive coated tape to the core of the spool on said rotor, means to index the spool and its attached tape to said winding station, means at said winding station to attach the tape to the web to secure the latter to the spool on the rotor and at the winding station, means to wind a definite length of film web onto the spool at said winding station, means to sever the web from the film wound on said spool, means to index the spool and its wound film to said retort loading station, means to slide an open end retort over the wound film spool, means to index said rotor to move the spool and retort to said capping station, and means at said last station to apply a cap over the open end of said retort to complete said magazine.

2. A machine for assembling roll film magazines, comprising, in combination, a spool supply station, a tape applying station, a film winding station, a retort loading station, a capping station, an indexing rotor movable between said stations, a spool supply, means to orient each of said spools, means to deliver the oriented spools to said spool supply station, said rotor being positionable to receive a spool at said supply station, means to index said rotor to move said spool from said loading station to said applying station, means at the applying station to apply an adhesive coated tape to the core of the spool on said rotor, means to index the spool and its attached tape to said winding station, means at said winding station to attach the tape to the web to secure the latter to the spool on the rotor and at the winding station, means to wind a definite length of film web onto the spool at said winding station, means to sever the web from the film wound on said spool, means to index the spool and its wound film to said retort loading station, means at said loading station to slide an open end retort over the wound film spool, means to index said rotor to move the spool and retort to said capping station, and means at said last station to apply a cap over the open end of said retort to complete said magazine.

3. A machine for assembling roll film magazines, comprising, in combination, a spool supply station, a tape applying station, a film winding station, a retort loading station, a capping station, an indexing rotor movable between said stations, said rotor being positionable to receive a spool at said supply station, means to index said rotor to move said spool from said loading station to said applying station, means at the applying station to apply an adhesive coated tape to the core of the spool on said rotor, means between said applying station and said winding station positioned to engage said tape to shape the latter to receive the film web at said winding station, means to index the spool and its attached strip to said winding station, means at said winding station to attach the tape to the web to secure the latter to the spool on the rotor and at the winding station, means to wind a definite length of film web onto the spool at said winding station, means to sever the web from the film wound on said spool, means to index the spool and its wound film to said retort loading station, means at said loading station to slide an open end retort over the wound film spool, means to index said rotor to move the spool and retort to said capping station, and means at said last station to apply a cap over the open end of said retort to complete said magazine.

4. A machine for assembling roll film magazines, comprising, in combination, a spool supply station, a tape applying station, a film winding station, a retort loading station, a capping station, an indexing rotor movable between said stations, said rotor being positionable to receive a spool at said supply station, means to index said rotor to move said spool from said loading station to said applying station, means at the applying station to apply an adhesive coated tape to the core of the spool on said rotor, means between said applying station and said winding station positioned to engage said tape to shape the latter to receive the film web at said winding station, means to index said spool and its shaped tape to said winding station, means at the last station for feeding said web toward said spool at said winding station, means for attaching said tape to the leading end of said web to secure the latter to said core, means for then winding a definite length of web onto the spool at the winding station, means to sever the web from the film wound on said spool, means to index the spool and its wound film to said retort loading station, means at said loading station to slide an open end retort over the wound film spool, means to index said rotor to move the spool and retort to said capping station, and means at said last station to apply a cap over the open end of said retort to complete said magazine.

5. A machine for assembling roll film magazines, comprising, in combination, a spool supply station, a tape applying station, a film winding station, a retort loading station, a capping station, an indexing rotor movable between said stations, said rotor being positionable to receive a spool at said supply station, means to index said rotor to move said spool from said loading station to said applying station, means at the applying station to apply an adhesive coated tape to the core of the spool on said rotor, means to index the spool and its attached tape to said winding station, means at said winding station to attach the tape to the web to secure the latter to the spool on the rotor and at the winding station, means to wind a definite length of film web onto the spool at said winding station, means to sever the web from the film wound on said spool, means to index the spool and its wound film to said retort loading station, means at said loading station to slide an open end retort over the wound film spool, means to index said rotor to move the spool and retort to said capping station, means to supply caps to said capping station, and means associated with said capping station to apply a cap over the open end of said retort to complete a magazine.

6. A machine for assembling roll film magazines, comprising, in combination, a spool supply station, a tape applying station, a film winding station, a retort loading station, a capping station, an indexing rotor movable between said stations, said rotor being positionable to receive a spool at said supply station, means to index said rotor to move said spool from said loading station to said applying station, means at the applying station to apply an adhesive coated tape to the core of the spool on said rotor, means to index the spool and its attached strip to said winding station, means at said winding station to attach the tape to the web to secure the latter to the spool on the rotor and at the winding staion, means to wind a definite length of film web onto the spool at said station, means to sever the web from the film wound on said spool, means to index the spool and its wound film to said retort loading station, means to slide an open end retort over the wound film spool, means to index said rotor to move the spool and retort to said capping station, a cap supply, means to orient said caps individually, means to supply oriented caps to said capping station, and means associated with said capping station for applying an oriented cap over the open end of the retort at said capping station to close said retort to complete a magazine.

7. A machine for assembling roll film magazines, comprising, in combination, a spool supply station, a tape applying station, a film winding station, a retort loading station, a capping station, an indexing rotor movable between said stations, a spool supply, means to orient each of said spools, means to deliver the oriented spools to said spool supply station, said rotor being positionable to receive an oriented spool at said spool supply station, means to index said rotor to said applying station, means at said last station for applying an adhesive coated tape to the core of the spool at said applying station, means to index said spool and its attached tape from said applying station to said winding station, means between the last two mentioned stations positioned to engage said tape to shape the latter relative to said spool core, means at said winding station for feeding the film web to said spool, means for attaching said film web to said tape to secure said film to the spool at said winding station, means for rotating said spool and feeding said web to wind a definite length of web onto said spool at said winding station, means to sever the wound film on said spool from said web, means to clamp the trailing end of said wound film adjacent said spool, means to index said rotor to move the wound spool from said winding station to said retort loading station, means associated with said last station to orient retorts as they approach said last station, means to slide an open ended oriented retort over said wound spool, means to index said wound spool and retort to the capping station, means to supply oriented caps to said capping station, and means to apply an oriented cap over the open end of said retort to complete a magazine.

8. A machine for assembling roll film magazines, comprising, in combination, a spool supply station, a tape applying station, a film winding station, a retort loading station, a capping station, an indexing rotor movable between said stations, said rotor being positionable to receive a spool at said supply station, means to index said rotor to move said spool from said loading station to said applying station, means at the applying station to apply an adhesive coated tape to the core of the spool on said rotor, means to index the spool and its attached tape to said winding station, means at said winding station to attach the tape to the web to secure the latter to the spool on the rotor and at the winding station, means to wind a definite length of film web onto the spool at said station, means to sever the web from the film wound on said spool, means to index the spool and its wound film to said retort loading station, means to supply retorts having one end open, means to orient each retort as it approaches the retort loading station, means to slide the open ended oriented retort over the wound spool at the retort loading station, means to index the rotor to move the retort and wound spool from the retort loading station to the capping station, and means to apply a closure cap over the open end of said retort at said capping station to complete a magazine.

9. A machine for assembling roll film magazines, comprising, in combination, a spool supply station, a tape applying station, a film winding station, a retort loading station, a capping station, an indexing rotor movable between said stations, a spool supply, means to orient each of said spools, means to deliver the oriented spools to said spool supply station, said rotor being positionable to receive an oriented spool at said spool supply station, means to index said rotor to said applying station, means at said last station for applying an adhesive coated tape to the core of the spool, means to index said spool and its attached tape from said applying station to said winding station, means between the last two mentioned stations positioned to engage said tape to shape the latter relative to said spool core, means at said winding station for feeding the film web to said spool, means for attaching said film web to said tape to secure said film to the spool at said winding station, means for rotating said spool and feeding said web to wind a definite length of web onto said spool at said winding station, means to sever the wound film on said spool from said web, means to clamp the trailing end of said wound film adjacent said spool, means to index said rotor to move the wound spool from said winding station to said retort loading station, means associated wtih said last station to orient retorts as they approach said station, means to slide an open ended oriented retort over said wound spool, means to index said wound spool and retort to the capping station, a supply of end closure caps for said retorts, means to orient said caps, means to supply said oriented caps to said capping station, means at said capping station for applying an oriented cap to a retort at said station to complete a magazine, and means for removing the completed retort from said rotor.

10. A machine for assembling roll film magazines, comprising, in combination, a spool supply station, a tape applying station, a film winding station, a retort loading station, a capping station, an indexing rotor movable between said stations, said rotor being positionable to receive a spool at said supply station, vacuum means on said rotor for retaining the spools thereon, means to index said rotor to move a spool from said loading station to said applying station, means at the applying station to apply an adhesive coated tape to the core of the spool on the rotor, means to index the spool and its attached tape to said winding station, means at said winding station to attach the tape to the web to secure the latter to the spool on the rotor and at the winding station, means to wind a definite length of film web onto the spool at said station, means to sever the web from the film wound on said spool, means to index the spool and its wound film to said retort loading station, means to slide an open end retort over the wound film spool, means to index said rotor to move the spool and retort to said capping station, and means at said last station to apply a cap over the open end of said retort to complete said magazine.

11. A machine for assembling roll film magazines, comprising in combination, a spool supply station, a tape applying station, a film winding station, a retort loading station, a capping station, an indexing rotor movable between said stations, said rotor being positionable to receive a spool at said supply station, vacuum means on said rotor for retaining the spools thereon, auxiliary means associated with certain of said stations and cooperating with said vacuum means for supporting the spool in accurate position on said rotor, means to index said rotor to move said spool from said loading station to said applying station, means at the applying station to apply an adhesive coated tape to the core of the spool on said rotor, means to index the spool and its attached tape to said winding station, means at said winding station to attach the tape to the web to secure the latter to the spool on the rotor and at the winding station, means to wind a definite length of film web onto the spool at said station, means to sever the web from the film wound on said spool, means to index the spool and its wound film to said retort loading station, means to slide an open end retort over the wound film spool, means to index said rotor to move the spool and retort to said capping station, and means at said last station to apply a cap over the open end of said retort to complete said magazine.

References Cited in the file of this patent

UNITED STATES PATENTS

| | | |
|---|---|---|
| 1,040,188 | Gray | Oct. 1, 1912 |
| 2,357,826 | Hahl | Sept. 12, 1944 |
| 2,361,264 | Christman | Oct. 24, 1944 |
| 2,383,664 | Malhiot | Aug. 28, 1945 |
| 2,532,760 | Davis | Dec. 5, 1950 |
| 2,560,737 | Palmer | July 17, 1951 |
| 2,579,199 | Marcalus | Dec. 18, 1951 |
| 2,609,912 | Engel | Sept. 9, 1952 |
| 2,615,566 | Ball | Oct. 28, 1952 |
| 2,643,499 | Gerlach | June 30, 1953 |
| 2,679,311 | Turner | May 25, 1954 |
| 2,720,069 | Brook | Oct. 11, 1955 |
| 2,735,250 | Buddecke | Feb. 21, 1956 |
| 2,749,692 | Conti | June 12, 1956 |
| 2,731,183 | Shaw | Jan. 17, 1956 |
| 2,776,094 | Edwards | Jan. 1, 1957 |